United States Patent
Kim et al.

(10) Patent No.: US 9,521,609 B2
(45) Date of Patent: Dec. 13, 2016

(54) METHOD AND DEVICE FOR UPDATING SYSTEM INFORMATION IN WIRELESS LAN SYSTEM

(71) Applicant: LG ELECTRONICS INC., Seoul (KR)

(72) Inventors: Jeongki Kim, Anyang-si (KR); Yongho Seok, Anyang-si (KR); Jinsam Kwak, Anyang-si (KR); Jinsoo Choi, Anyang-si (KR); Kiseon Ryu, Anyang-si (KR); Giwon Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/421,416

(22) PCT Filed: Aug. 13, 2013

(86) PCT No.: PCT/KR2013/007301
§ 371 (c)(1),
(2) Date: Feb. 12, 2015

(87) PCT Pub. No.: WO2014/027829
PCT Pub. Date: Feb. 20, 2014

(65) Prior Publication Data
US 2015/0245282 A1   Aug. 27, 2015

Related U.S. Application Data

(60) Provisional application No. 61/682,326, filed on Aug. 13, 2012, provisional application No. 61/694,263, (Continued)

(51) Int. Cl.
| | |
|---|---|
| H04W 4/00 | (2009.01) |
| H04W 48/16 | (2009.01) |
| H04W 48/14 | (2009.01) |
| H04W 48/20 | (2009.01) |
| H04W 84/12 | (2009.01) |

(52) U.S. Cl.
CPC ............ *H04W 48/16* (2013.01); *H04W 48/14* (2013.01); *H04W 48/20* (2013.01); *H04W 84/12* (2013.01)

(58) Field of Classification Search
None
See application file for complete search history.

(56) References Cited

U.S. PATENT DOCUMENTS

| | | |
|---|---|---|
| 2012/0039313 A1 | 2/2012 | Jain |
| 2012/0113869 A1 | 5/2012 | Gaal et al. |

(Continued)

FOREIGN PATENT DOCUMENTS

| | | |
|---|---|---|
| KR | 10-2009-0090626 | 8/2009 |

OTHER PUBLICATIONS

PCT International Application No. PCT/KR2013/007301, Written Opinion of the International Searching Authority dated Dec. 2, 2013, 16 pages.

(Continued)

*Primary Examiner* — Michael J Moore, Jr.
(74) *Attorney, Agent, or Firm* — Lee Hong Degerman Kang Waimey

(57) ABSTRACT

The present invention relates to a method and a device for updating system information in a wireless LAN system. A method for updating system information in a station (STA) of a wireless communication system may comprise transmitting, by the STA which stores system information and a configuration change count value of a previously linked preferred access point (AP), a probe request frame for active scanning to the preferred AP; and receiving a probe response frame from the preferred AP. Preferably, the probe request frame includes a configuration change count field previously acquired from the preferred AP, and if a value of the configuration change count field included in the probe (Continued)

request frame is different from a present configuration change count value of the preferred AP, the probe response frame may include one or more elements of system information which should be updated by the STA.

12 Claims, 27 Drawing Sheets

Related U.S. Application Data filed on Aug. 29, 2012, provisional application No. 61/702,259, filed on Sep. 18, 2012, provisional application No. 61/703,214, filed on Sep. 19, 2012, provisional application No. 61/712,286, filed on Oct. 11, 2012, provisional application No. 61/857,684, filed on Jul. 23, 2013.

(56) References Cited

U.S. PATENT DOCUMENTS

| | | |
|---|---|---|
| 2012/0176975 A1 | 7/2012 | Choi et al. |
| 2013/0107757 A1* | 5/2013 | Cherian ............... H04W 48/16 370/255 |
| 2013/0142124 A1* | 6/2013 | Abraham ............... H04W 28/06 370/328 |
| 2013/0177001 A1* | 7/2013 | Abraham ............... H04W 28/06 370/338 |
| 2013/0230035 A1* | 9/2013 | Grandhi ................ H04W 48/16 370/338 |
| 2014/0211680 A1* | 7/2014 | Seok .................. H04W 52/0216 370/311 |
| 2016/0081130 A1* | 3/2016 | Wang .................. H04W 76/021 370/254 |

OTHER PUBLICATIONS

Park, et al., "GAS Procedure in TGai," IEEE 802.11-12/0255r1, XP68038496, Mar. 2012, 8 pages.

Abraham, et al., "Short Beacon," Qualcomm Inc, IEEE 802.11-12/0129r1, XP17672788, Jan. 2012, 14 pages.

Kim, et al., "System Information Update Procedure for 11 Ah," IEEE 802.11-12/1093r0, XP68039809, Sep. 2012, 12 pages.

European Patent Office Application Serial No. 13879271.8, Search Report dated Feb. 19, 2016, 11 pages.

* cited by examiner

FIG. 8
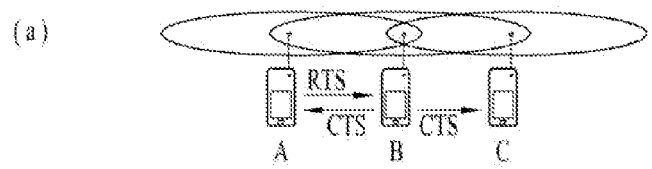
(a)
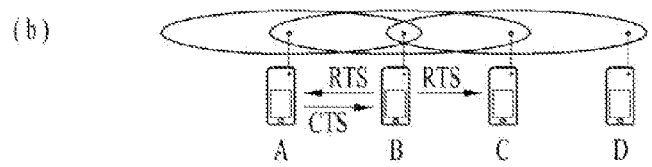
(b)
FIG. 9
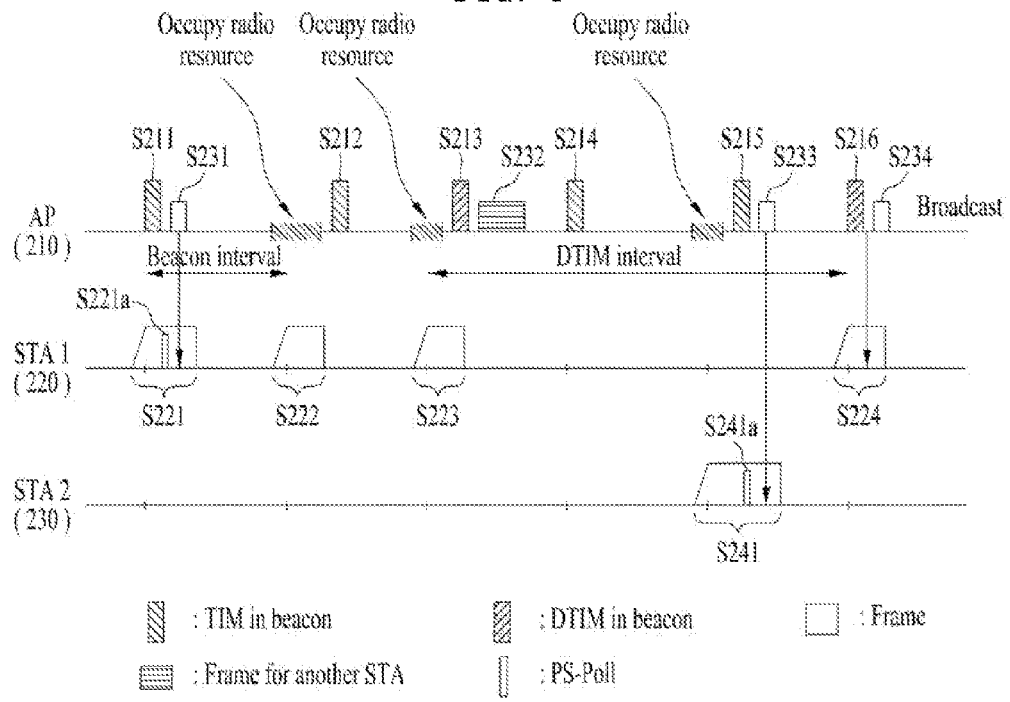
FIG. 10
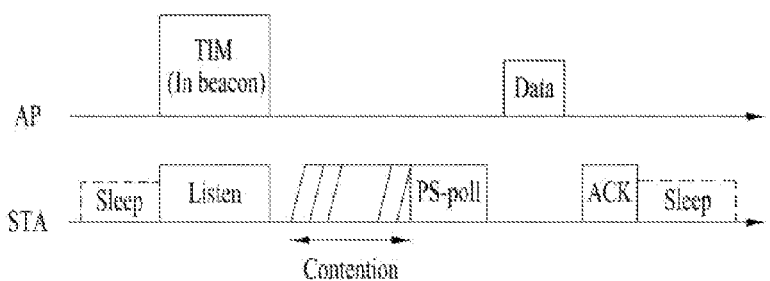

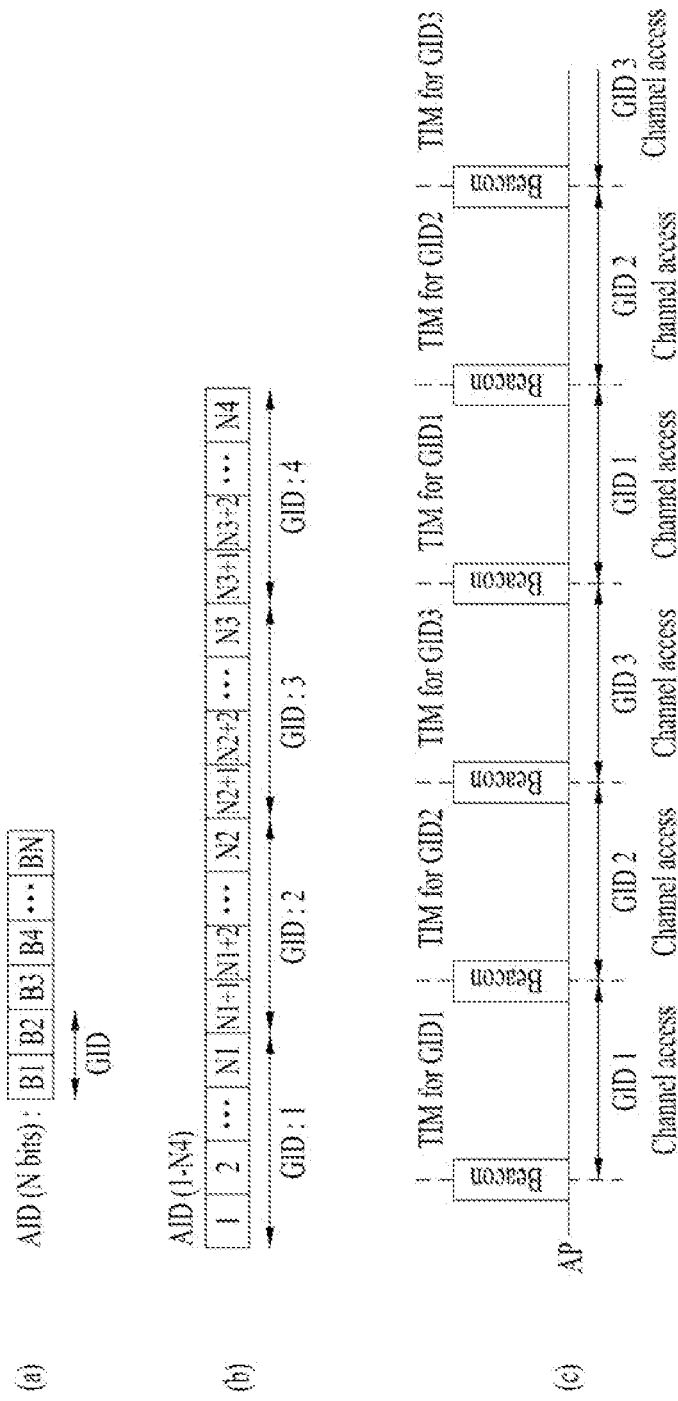

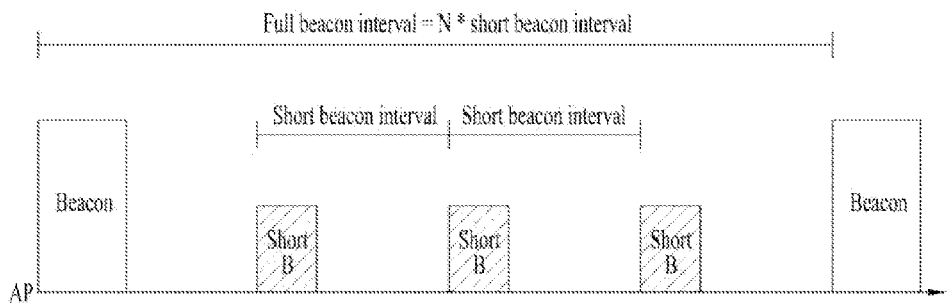

FIG. 29
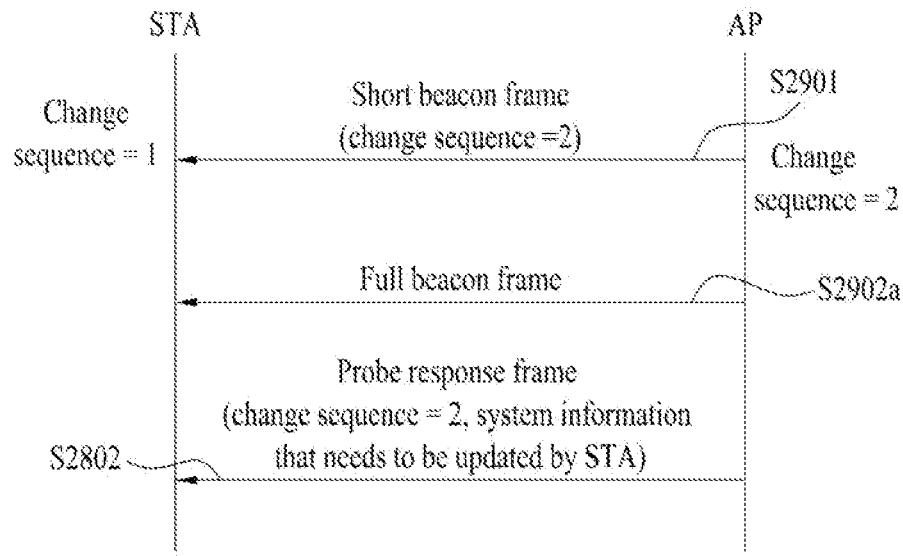
(a)
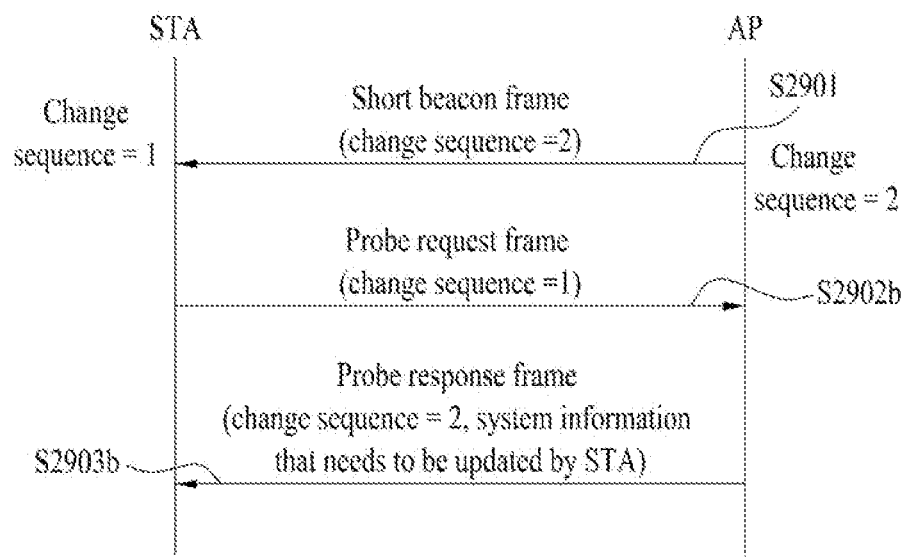
(b)

FIG. 30
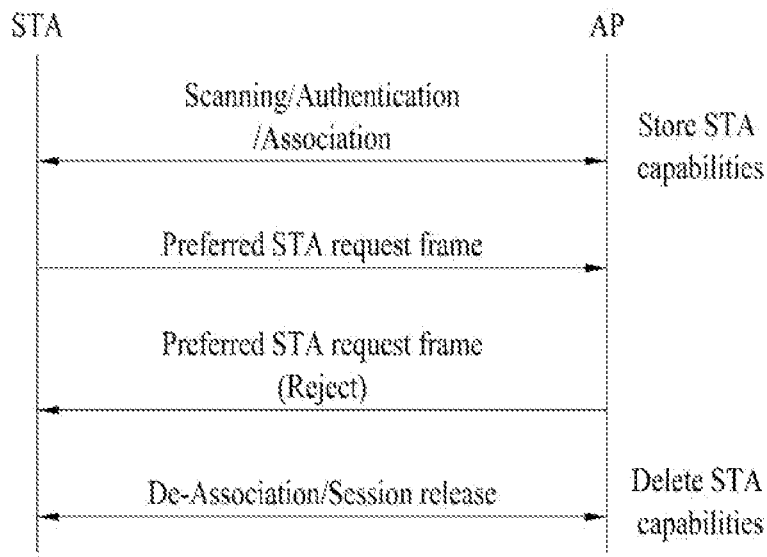
(a)
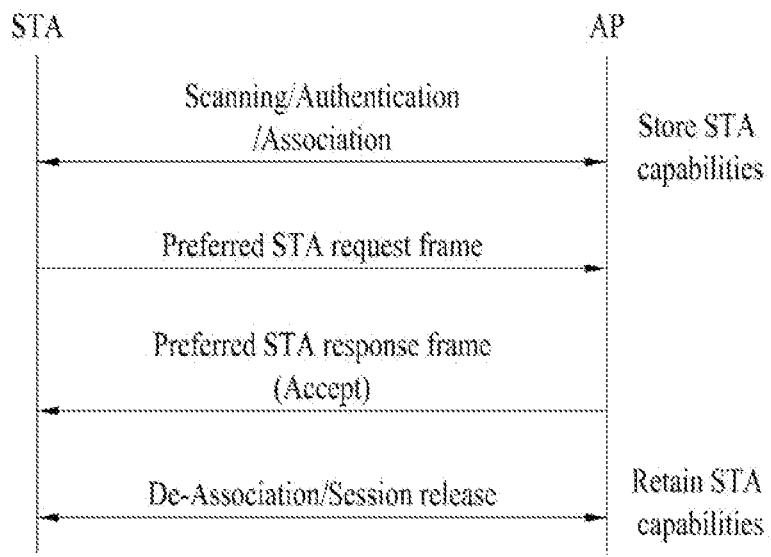
(b)

FIG. 35

| Octet: | 2 | 6 | 6 | 2 | variable | 4 |
|---|---|---|---|---|---|---|
| | FC | Dest MAC Address | Src MAC Address | Sequence Control | Body | FCS |

FIG. 36

| | FC | DA | SA | Change sequence | Optional IEs | FCS |
|---|---|---|---|---|---|---|
| Octet: | 2 | 6 | 6 | 1 | variables | 4 |

FIG. 37

| | FC | DA | SA | Time stamp | Change sequence | Optional IEs | FCS |
|---|---|---|---|---|---|---|---|
| Octet: | 2 | 6 | 6 | 8 | 1 | variables | 4 |

METHOD AND DEVICE FOR UPDATING SYSTEM INFORMATION IN WIRELESS LAN SYSTEM

CROSS-REFERENCE TO RELATED APPLICATIONS

This application is the National Stage filing under 35 U.S.C. 371 of International Application No. PCT/KR2013/007301, filed on Aug. 13, 2013, which claims the benefit of U.S. Provisional Application Ser. No. 61/682,326, filed on Aug. 13, 2012, 61/694,263, filed on Aug. 29, 2012, 61/702,259, filed on Sep. 18, 2012, 61/703,214, filed on Sep. 19, 2012, 61/712,286, filed on Oct. 11, 2012, and 61/857,684, filed on Jul. 23, 2013, the contents of which are all hereby incorporated by reference herein in their entirety.

TECHNICAL FIELD

The present invention relates to a wireless communication system and, more specifically, to a method and a device for updating system information in a wireless LAN system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DISCLOSURE

Technical Problem

M2M (Machine-to-Machine) communication technology is discussed as next-generation communication technology. In IEEE 802.11 WLAN systems, IEEE 802.11ah is being developed as a technical standard for supporting M2M communication. A scenario in which a small quantity of data is transmitted and received at a low speed occasionally in an environment having so many devices may be considered in M2M communication.

Communication in wireless LAN systems is performed through a medium shared by all devices. When the number of devices increases as in M2M communication, taking a long time for channel access of one device can not only cause system performance deterioration but also obstruct power saving of devices.

An object of the present invention is to provide a new mechanism of updating system information.

The technical problems solved by the present invention are not limited to the above technical problems and those skilled in the art may understand other technical problems from the following description.

Technical Solution

To accomplish the object of the present invention, there is provided a method for updating system information in a station (STA) of a wireless communication system, including: transmitting, by the STA, a probe request frame for active scanning to a previously associated preferred access point (AP), the STA storing system information and a configuration change count value of the previously associated preferred AP; and receiving a probe response frame from the preferred AP. The probe request frame includes a configuration change count field previously acquired from the preferred AP, and when a value of the configuration change count field included in the probe request frame is different from a current configuration change count value of the preferred AP, the probe response frame includes one or more elements of system information required to be updated by the STA.

To accomplish the object of the present invention, there is provided a method for providing system information updated in an AP of a wireless communication system, including: receiving a probe request frame for active scanning from a preferred STA previously associated with the AP and storing system information and a configuration change count value of the AP; and transmitting a probe response frame to the preferred STA. The probe request frame includes a configuration change count field previously acquired by the preferred STA from the AP, and when a value of the configuration change count field included in the probe request frame is different from a current configuration change count value of the AP, the probe response frame includes one or more elements of system information required to be updated by the preferred STA.

To accomplish the object of the present invention, there is provided a station (STA) updating system information in a wireless communication system, including: a memory storing system information and a configuration change count value of a previously associated preferred AP; a transceiver; and a processor configured to transmit a probe request frame for active scanning to the preferred AP and to receive a probe response frame from the AP. The probe request frame includes a configuration change count field previously acquired from the preferred AP, and when a value of the configuration change count field included in the probe request frame is different from a current configuration change count value of the preferred AP, the probe response frame includes one or more elements of system information required to be updated by the STA.

To accomplish the object of the present invention, there is provided an AP providing updated system information in a wireless communication system, including: a transceiver; and a processor configured to receive a probe request frame for active scanning from a preferred STA previously associated with the AP and storing system information and a configuration change count value of the AP and to transmit a probe response frame to the preferred STA. The probe request frame includes a configuration change count field previously acquired by the preferred STA from the AP, and when a value of the configuration change count field included in the probe request frame is different from a current configuration change count value of the AP, the probe response frame includes one or more elements of system information required to be updated by the preferred STA.

The above description and the following description are exemplary and are for additional explanation of the claims.

Advantageous Effects

The present invention can provide a new apparatus and method for updating system information.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 8 is a conceptual diagram illustrating RTS (Request To Send) and CTS (Clear To Send).

FIG. 9 is a conceptual diagram illustrating a power management operation.

FIGS. 10 to 12 are conceptual diagrams illustrating detailed operations of a station (STA) having received a Traffic Indication Map (TIM).

FIG. 13 is a conceptual diagram illustrating a group-based AID.

FIG. 14 is a conceptual diagram illustrating a short beacon.

FIG. 15 is a conceptual diagram illustrating exemplary fields included in a short beacon frame.

FIG. 16 illustrates a short beacon frame format according to an embodiment of the present invention.

FIG. 29 is a diagram illustrating an example of performing fast initial link setup during passive scanning.

FIG. 30 is a diagram illustrating a procedure of setting an associated AP as a preferred AP.

FIG. 35 illustrates another exemplary short MAC header.

FIG. 36 illustrates another exemplary FILS probe request frame.

FIG. 37 illustrates an exemplary FILS probe response frame.

BEST MODE

Figure 1:
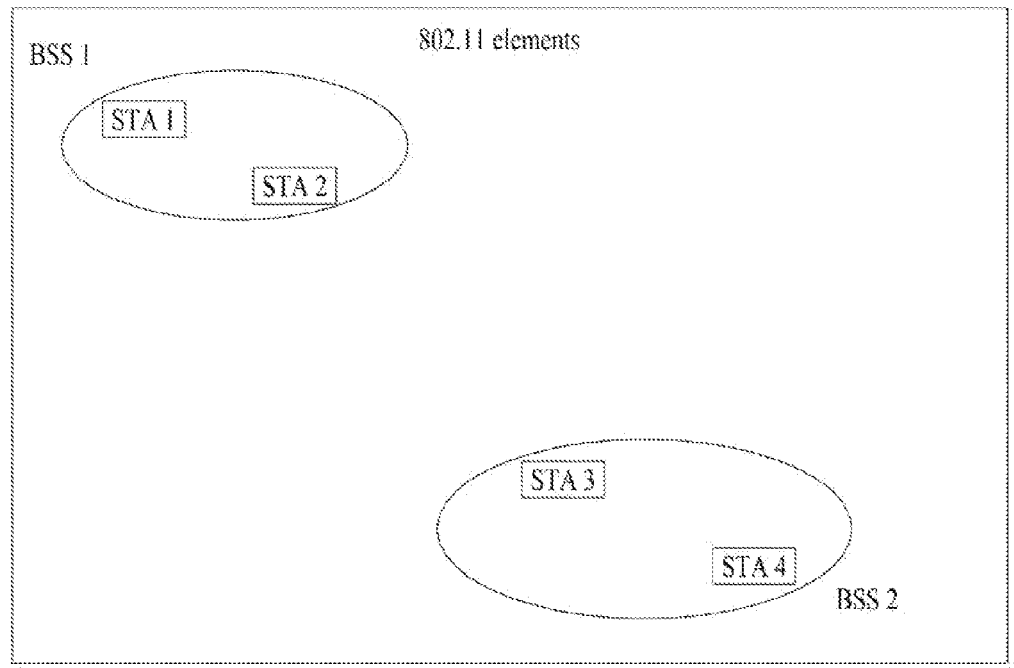
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
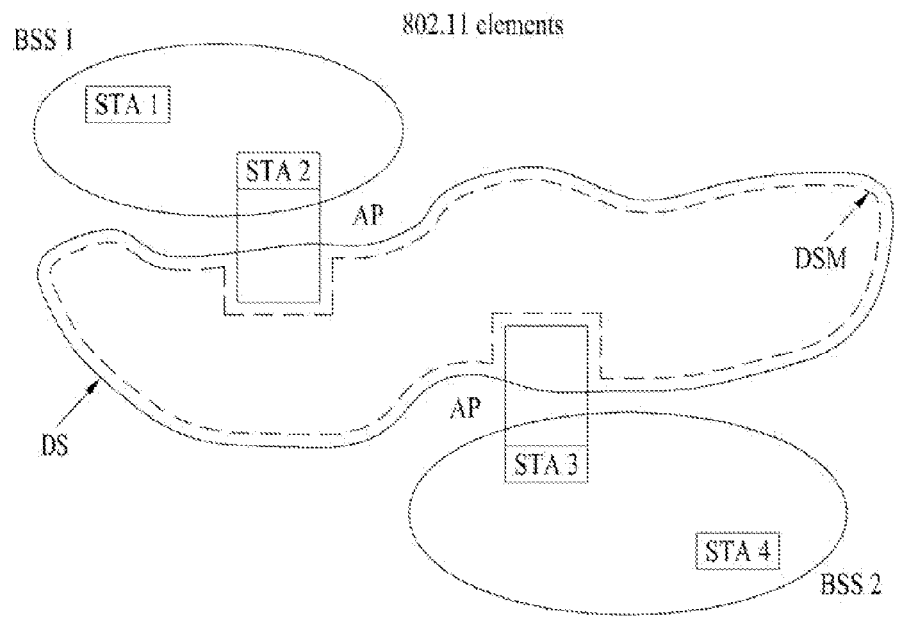
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
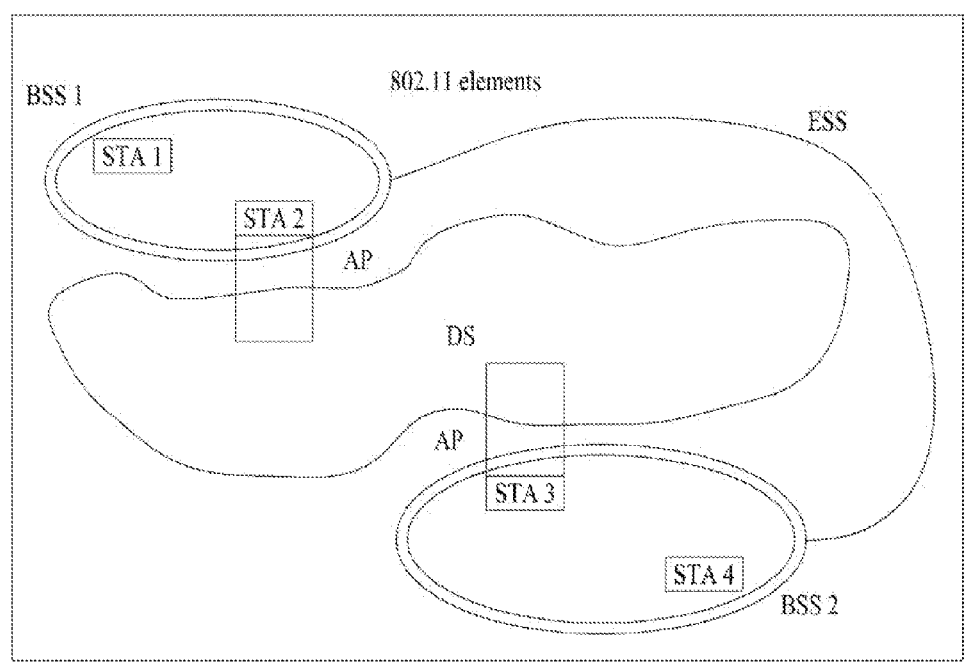
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
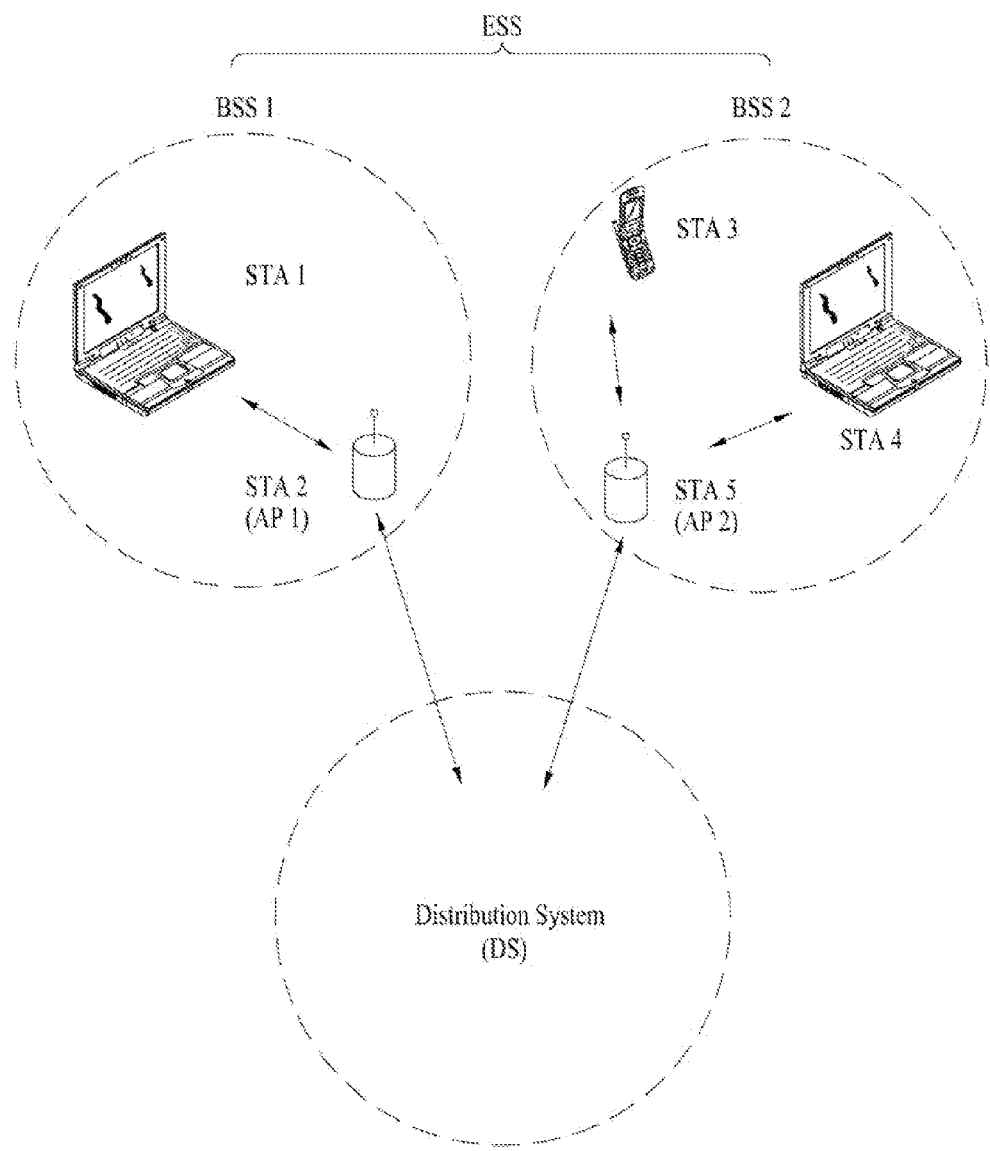
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
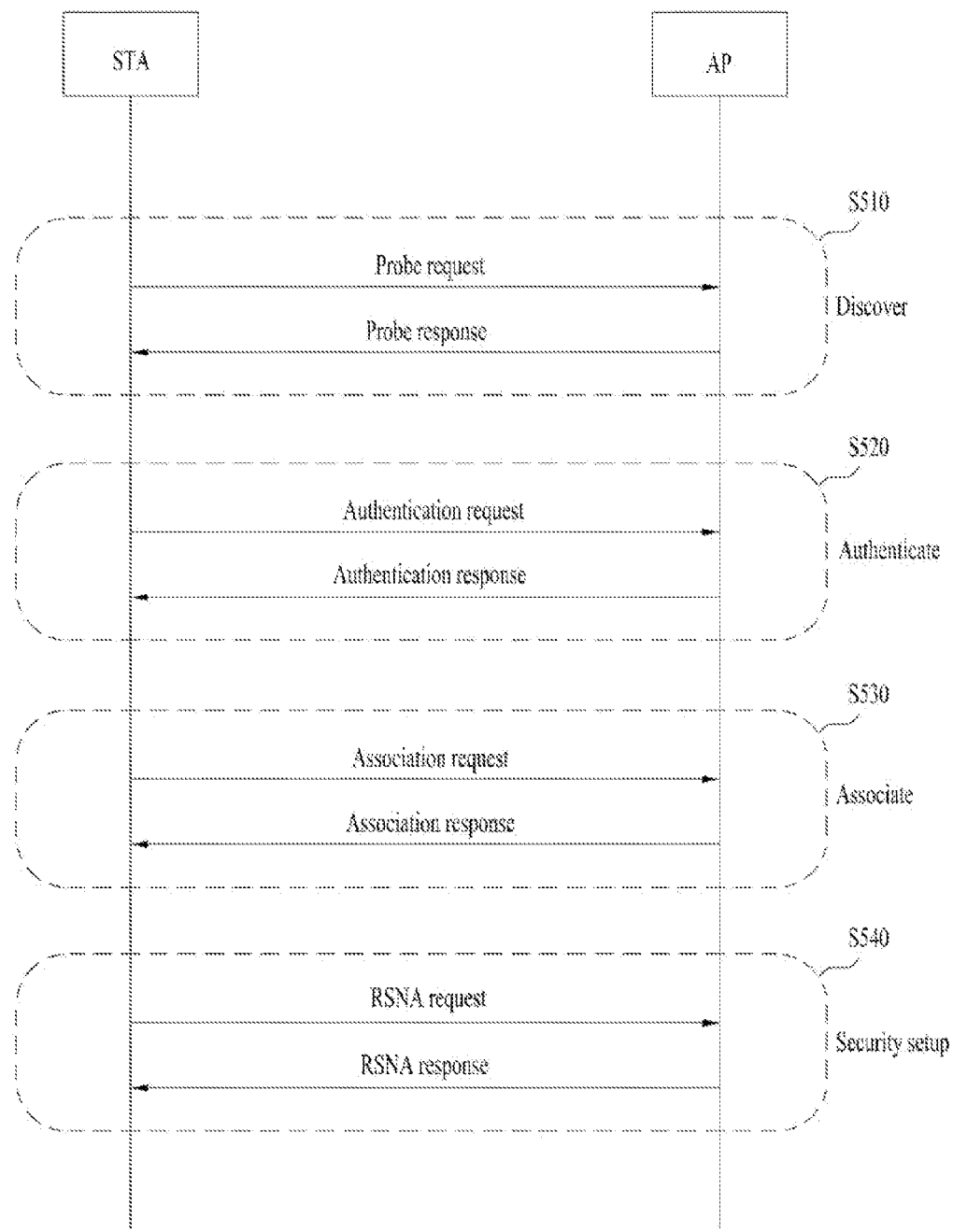
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
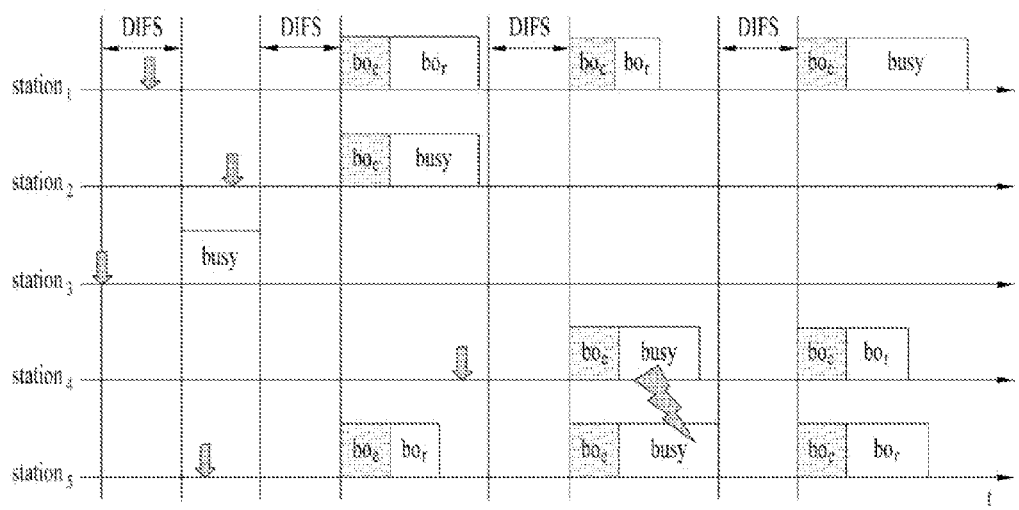
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit or defer medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
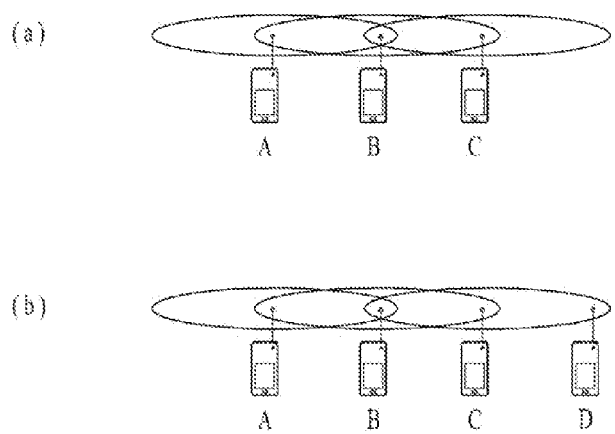
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA 1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 11:
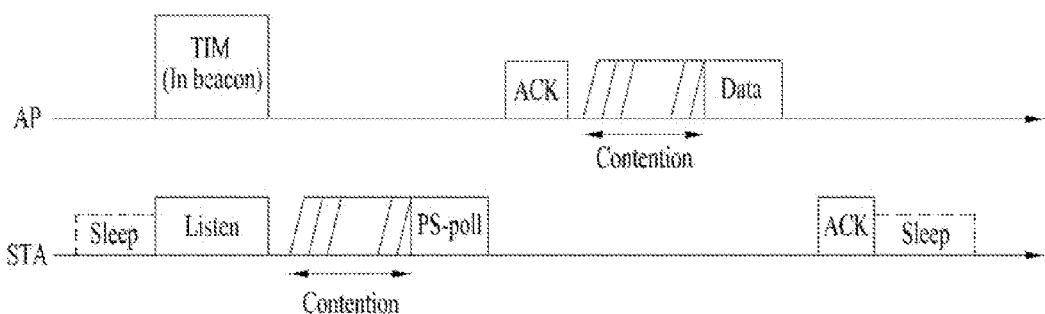
Figure 12:
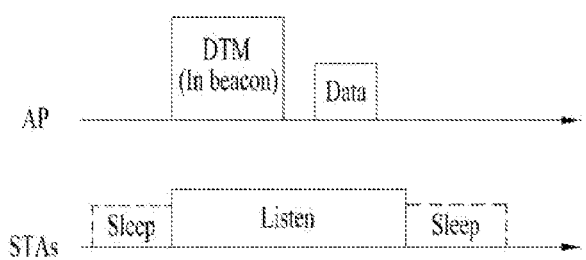

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

PPDU Frame Format

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

Short Beacon

A normal beacon frame is composed of a MAC header, a frame body and an FCS and the frame body may include the following fields.

A timestamp field is for synchronization and all STAs that have received a beacon frame can change/update local clock signals thereof according to a timestamp value.

A beacon interval field indicates an interval between beacon transmissions and is represented as a time unit (TU). The TU may be represented in microseconds and can be defined as 1024 μs, for example. A time when an AP needs to transmit a beacon can be represented as a target beacon transmission time (TBTT). That is, a beacon interval field corresponds to an interval between a beacon frame transmission time and the next TBTT. An STA that has received a previous beacon can calculate a transmission time of the next beacon from the beacon interval field. In general, a beacon interval can be set to 100 TU.

Capability information field includes information about capabilities of a device/network. For example, the network type of an ad hoc or infrastructure network can be indicated through the capability information field. Further, the capability information field may be used to signal whether polling is supported, details of encryption and the like.

In addition, the beacon frame can include an SSID, supported rates, frequency hopping (FH) parameter set, direct sequence spread spectrum (DSSS) parameter set, contention free (CF) parameter set, IBSS parameter set, TIM, country IE, power constraint, QoS capability, high-throughput (HT) capability and the like. However, the aforementioned fields/information included in the beacon frame are exemplary and the beacon frame mentioned in the present invention is not limited thereto.

Distinguished from the above-described normal beacon frame, a short beacon frame can be defined. A conventional normal beacon may be referred to as a full beacon to be discriminated from the short beacon.

FIG. 14 is a diagram illustrating the short beacon.

A short beacon interval is represented in TUs and a beacon interval (i.e. beacon interval of the full beacon) can be defined as an integer multiple of the short beacon interval. As shown in FIG. 14, the full beacon interval can be defined as Full Beacon Interval=N*Short Beacon Interval (here, N≥1). For example, the short beacon can be transmitted more than once during an interval between successive full beacon transmission times. FIG. 14 illustrates an example in which the short beacon Short B is transmitted three times during the full beacon interval.

The STA may determine whether a desired network is available using an SSID (or compressed SSID) included in a short beacon. The STA may transmit an association request to a MAC address of an AP, which is included in the short beacon transmitted from the desired network. Since the short beacon is transmitted more frequently than the full beacon, in general, an unassociated STA can rapidly associate with a desired AP by supporting the short beacon. When the STA needs additional information for association, the STA can transmit a probe request to a desired AP. Further, the STA can perform synchronization using timestamp information included in the short beacon. In addition, whether system information (or network information or system parameters (system/network information (parameters) are collectively referred to as "system information" hereinafter)) has been changed can be signaled through the short beacon. When the system information has been changed, the STA may acquire the changed system information through a full beacon. The short beacon may include a TIM. That is, the TIM may be provided through the full beacon or the short beacon.

FIG. 15 is a diagram illustrating exemplary fields included in the short beacon frame.

A frame control (FC) field may include protocol version, type, subtype, next full beacon present, SSID present, BSS bandwidth (BW) and security fields. The FC may have a length of 2 octets From among the subfields of the FC field, the protocol version field has a length of 2 bits and may be set to 0 by default. The type field and the subtype field are respectively defined as 2-bit and 4-bit fields and can indicate the function of the corresponding frame together (for example, the type field and the subtype field can indicate that the corresponding frame is a short beacon frame). The next full beacon present field is defined as a 1-bit field and can be set to a value indicating whether a duration to next full beacon field (or information about the next TBTT) is included in the short beacon frame. The SSID present field is defined as a 1-bit field and can be set to a value indicating whether a compressed SSID field is present in the short beacon frame. The BSS BW field is defined as a 3-bit field and can be set to a value indicating a current operation bandwidth (e.g. 1, 2, 4, 8 or 16 MHz) of a BSS. The security field is defined as a 1-bit field and can be set to a value indicating whether the corresponding AP is an RSNA AP. The remaining bits (e.g. 2 bits) may be reserved.

A sound address (SA) field in the short beacon frame may be a MAC address of an AP that transmits the short beacon. The SA may have a length of 6 octets.

A timestamp field in the short beacon frame may include LSB (Least Significant Bit) 4 bytes (i.e. 4 octets) of the timestamp of the AP. Even when only the LSB 4 bytes are provided, instead of all timestamp values, an STA that has received all timestamp values (e.g. associated STA) can perform synchronization using the LSB 4 bytes.

A change sequence field in the short beacon frame may include information for signaling whether system information has been changed. Specifically, when critical information (e.g. full beacon information) of the network is changed, a change sequence counter increases by 1. This field is defined as a 1-octet field.

A duration to next full beacon field may be included in the short beacon or not. This field can signal, to the STA, a duration from a transmission time of the corresponding short beacon to a transmission time of the next full beacon. Accordingly, the STA that has listened to the short beacon may reduce power consumption by operating in a doze (or sleep) mode until the next full beacon. Alternatively, the duration to next full beacon field may be configured as information indicating the next TBTT. The length of this field can be defined as 3 octets, for example A compressed SSID field may be included in the short beacon or not. This field may include part or a hash of the SSID of the corresponding network. An STA that already knew the corresponding network can be allowed to discover the network using the SSID. The length of this field can be defined as 4 octets, for example.

The short beacon frame may include additional or optional fields or information elements (IEs) in addition to the aforementioned exemplary fields.

A forward error correction (FFC) field included in the short beacon frame can be used to check whether the short beacon frame has an error and may be configured as an FCS field. This field can be defined as a 4-octet field.

Improved System Information Update Method

While an AP periodically transmits a full beacon frame including system information in a conventional wireless LAN environment, the full beacon frame including the system information may not be periodically transmitted all the time in an enhanced wireless LAN environment. For example, a beacon may not be transmitted when an associated STA is not present in a home LAN environment. Even if the full beacon frame is periodically transmitted, the short beacon may not include the duration to next full beacon field in order to reduce overhead of the short beacon. In this case, the AP can set the next full beacon present field in the FC field of the short beacon frame to 0 and transmit the short beacon that does not include the duration to next full beacon field.

In this case, when the AP does not notify the STA that the full beacon is not transmitted, the STA repeats attempting and failing to receive the full beacon and thus power consumption of the STA may increase. Further, when the short beacon does not include information about a time when the next full beacon can be received, the STA continuously attempts to receive the full beacon until the full beacon is actually transmitted even though the STA has received the short beacon. This may increase power consumption of the STA. Accordingly, power consumption of the STA can be reduced when the AP rapidly informs the STA that the AP does not transmit the full beacon or transmission of the next full beacon is not periodically performed.

In addition, when the STA determines that the AP does not transmit the full beacon, the STA can obtain system information through a probe request/response operation, instead of waiting for the full beacon, and efficiently perform association with the corresponding AP. For example, upon reception of a probe request frame from the STA, the AP can transmit a probe response frame including system information (e.g. SSID, supported rates, FH parameter set, DSSS parameter set, CF parameter set, IBSS parameter set, country IE and the like) to the STA in response to the probe request frame. Accordingly, the STA can obtain the system information provided through the probe response frame and associate with the corresponding AP by performing association request/response.

Since the full beacon including the system information is periodically transmitted in conventional wireless LAN operation, the STA can obtain changed system information by receiving the next beacon when the system information is changed. In an environment in which the full beacon including the system information is not periodically transmitted, however, the STA may not obtain the changed system information at an appropriate time. In this case, the STA cannot correctly operate in the corresponding wireless LAN network.

The present invention provides a method by which an STA can correctly obtain changed system information and retain updated system information in a system in which an AP does not periodically transmit a full beacon frame (i.e. a frame including the system information).

Embodiment 1

The present embodiment relates to a method by which the AP notifies the STA whether the full beacon frame including the system information is periodically transmitted.

For example, information indicating whether the full beacon frame is periodically transmitted can be included in a short beacon frame and signaled to the STA.

FIG. 16 illustrates a short beacon frame format according to an embodiment of the present invention.

As shown in FIG. 16, a full beacon present field may be defined in an FC field of a short beacon frame. The full beacon present field may be set to a value indicating whether a periodically transmitted full beacon is present. For example, when the AP transmits a full beacon (or periodically transmits the full beacon), the value of the full beacon present field can be set to 1. When the value of the full beacon present field is set to 0, this value can mean that the AP does not transmit the full beacon (or does not periodically transmit the full beacon). When the value of the full beacon present field is set to 0, a next full beacon present field in the FC field of the short beacon frame can be set to a value (e.g. 0) indicating that a duration to next full beacon field is not present in the short beacon frame.

Figure 17:
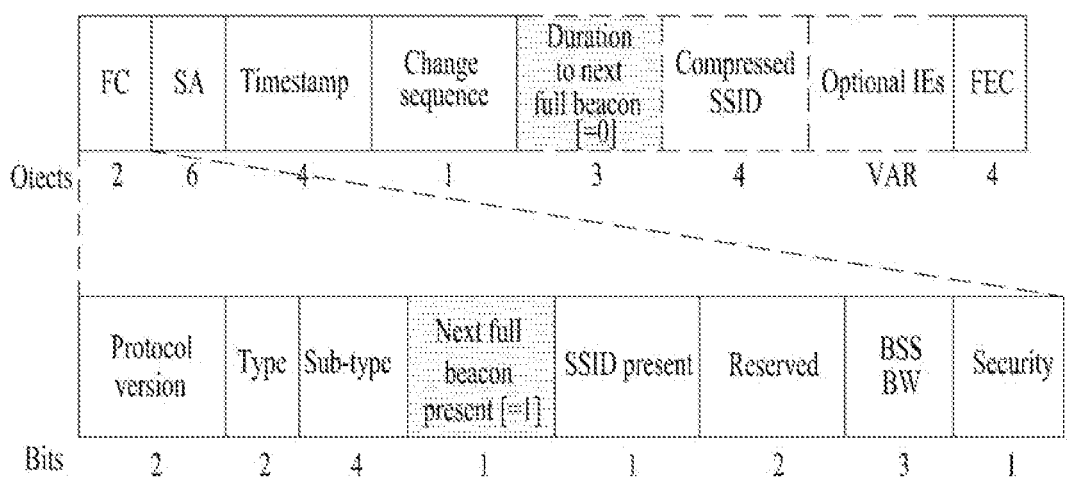
FIG. 17 illustrates a short beacon frame format according to another embodiment of the present invention.

FIG. 17 illustrates a short beacon frame format according to another embodiment of the present invention.

As shown in FIG. 17, when the next full present field in the FC field of the short beacon is set to 1 and the duration to next full beacon field has a predetermined value (for example, all bits are set to 0 or 1), this can indicate that a full beacon is not transmitted (or the full beacon is not periodically transmitted). Distinguished from the example of FIG. 16 in which an explicit field indicating presence or absence of the full beacon is additionally defined, the example of FIG. 17 may be considered to be a method of implicitly indicating absence of the full beacon when values of existing fields constitute a specific combination.

The example of FIG. 17 shows that the AP does not transmit the full beacon when the value of the duration to next full beacon field is set to 0. In this case, the duration to next full beacon field needs to be included in the short beacon frame all the time even though the AP does not transmit the full beacon.

Embodiment 2

The present embodiment describes operations of an AP and an STA according to whether a full beacon is transmitted.

Figure 18:
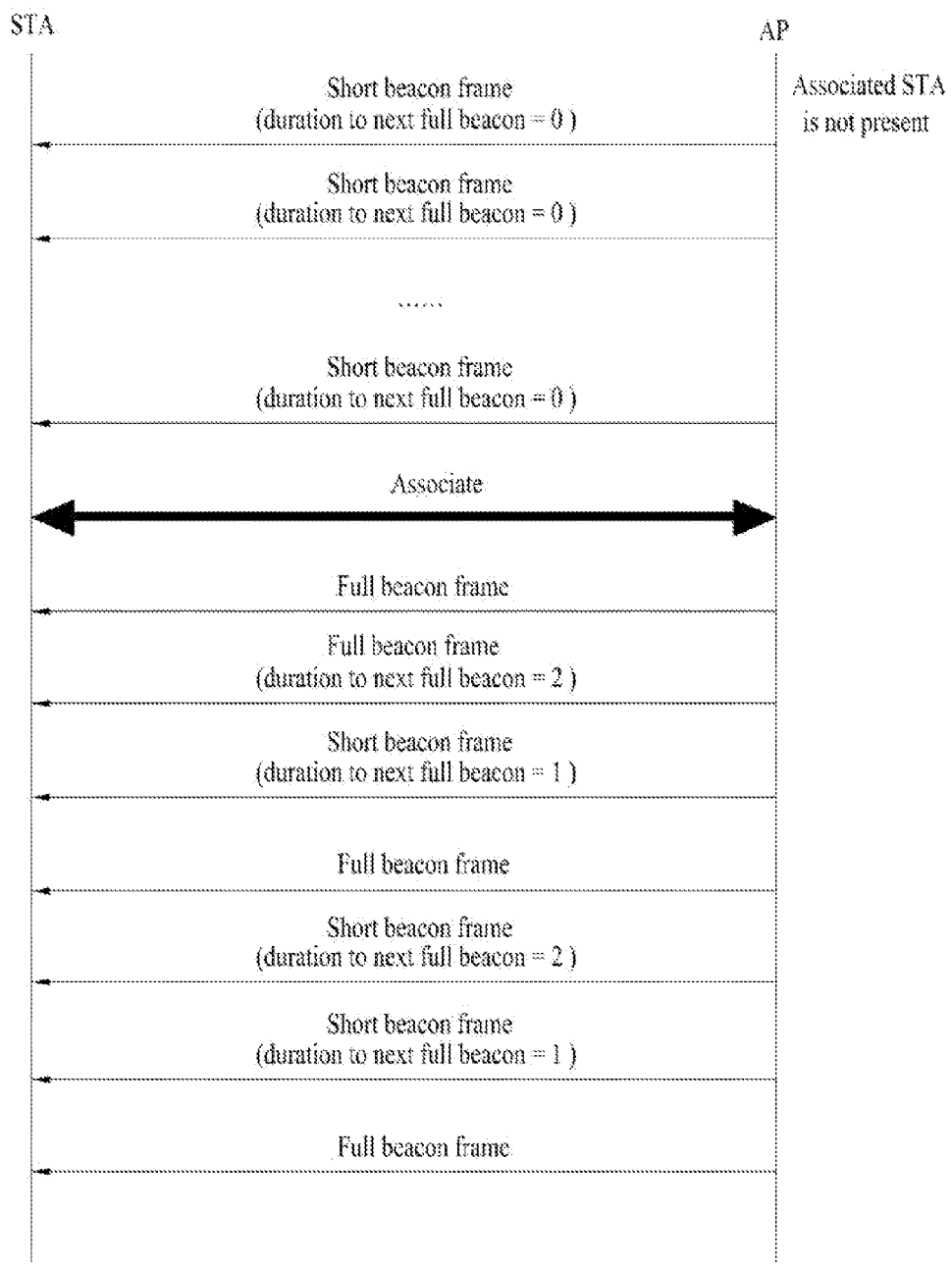
FIG. 18 is a diagram illustrating a method for transmitting and receiving a full beacon frame according to an embodiment of the present invention.

FIG. 18 is a diagram illustrating a method for transmitting and receiving a full beacon frame according to an embodiment of the present invention.

The AP may not transmit a full beacon when an STA associated with the AP is not present. In this case, the AP may inform the STA that the full beacon is not transmitted through a specific field of a short beacon (for example, by setting the value of the duration to next full beacon field to 0, as shown in FIG. 17).

When an STA associated with the AP is present, the AP starts to transmit the full beacon. In this case, the duration to next full beacon field of the short beacon frame can be set to a value (e.g. a non-zero value) that indicates a transmission time of the next full beacon and the STA that has received the short beacon can determine a reception time of the next full beacon.

When the AP does not transmit the full beacon, as shown in the example of FIG. 16, the duration to next full beacon field may not be included in the short beacon frame and the next full beacon present field may be set to 0. Upon reception of this short beacon frame, the STA may determine that the full beacon is not transmitted and thus the STA can immediately perform active scanning without waiting for the full beacon. Alternatively, upon determining that the full beacon is not transmitted from information included in the short beacon frame, the STA may perform active scanning when the STA waits for a predetermined time (e.g. 100 ms (i.e. a default beacon interval)) from when the short beacon is received and then does not receive the full beacon for the predetermined time.

The STA may transmit a probe request frame to the AP through active scanning, receive a probe response frame from the AP as a response to the probe request frame and acquire system information included in the probe response frame. The probe response frame may include information (e.g. change sequence (or version) information) indicating whether the system information is changed. The change sequence information may be called (AP) configuration change count (CCC) since the change sequence information is incremented by 1 whenever the system information is changed.

Figure 19:
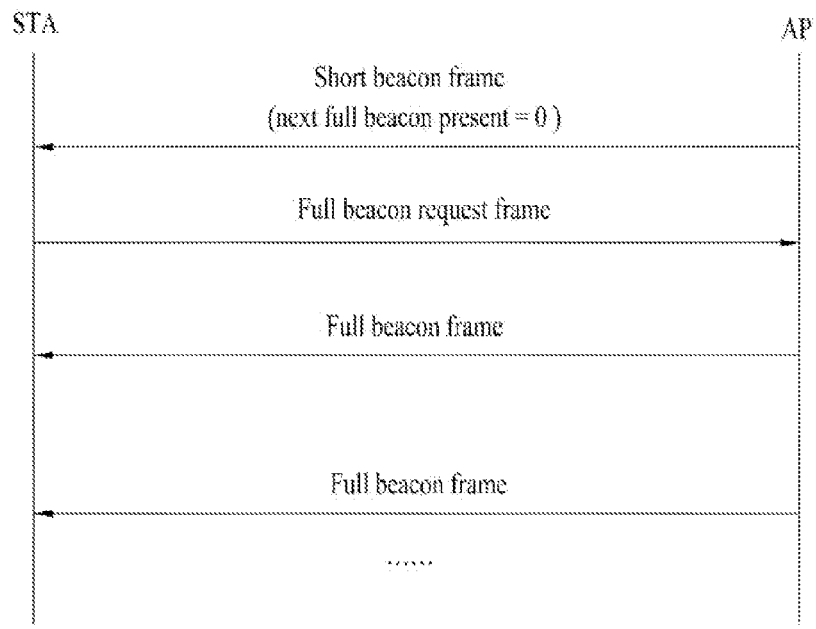
FIG. 19 is a diagram illustrating a method for transmitting and receiving a full beacon frame according to another embodiment of the present invention.

FIG. 19 is a diagram illustrating a method for transmitting and receiving a full beacon frame according to another embodiment of the present invention.

When the STA determines that the AP does not transmit the full beacon frame from information included in the short beacon frame (e.g. as shown in the example of FIG. 16 or FIG. 17), the STA may request the AP to transmit the full beacon frame.

To this end, the STA may transmit a full beacon request frame to the AP. Upon reception of the full beacon request frame, the AP may start to transmit the full beacon frame in response to the full beacon request frame.

For example, the AP can periodically transmit the full beacon frame for a predetermined time or a predetermined number of times after reception of the full beacon request frame from the STA. The predetermined time/predetermined number of times may be set according to a value requested by the STA or on the basis of a value predetermined according to system characteristics.

Figure 20:
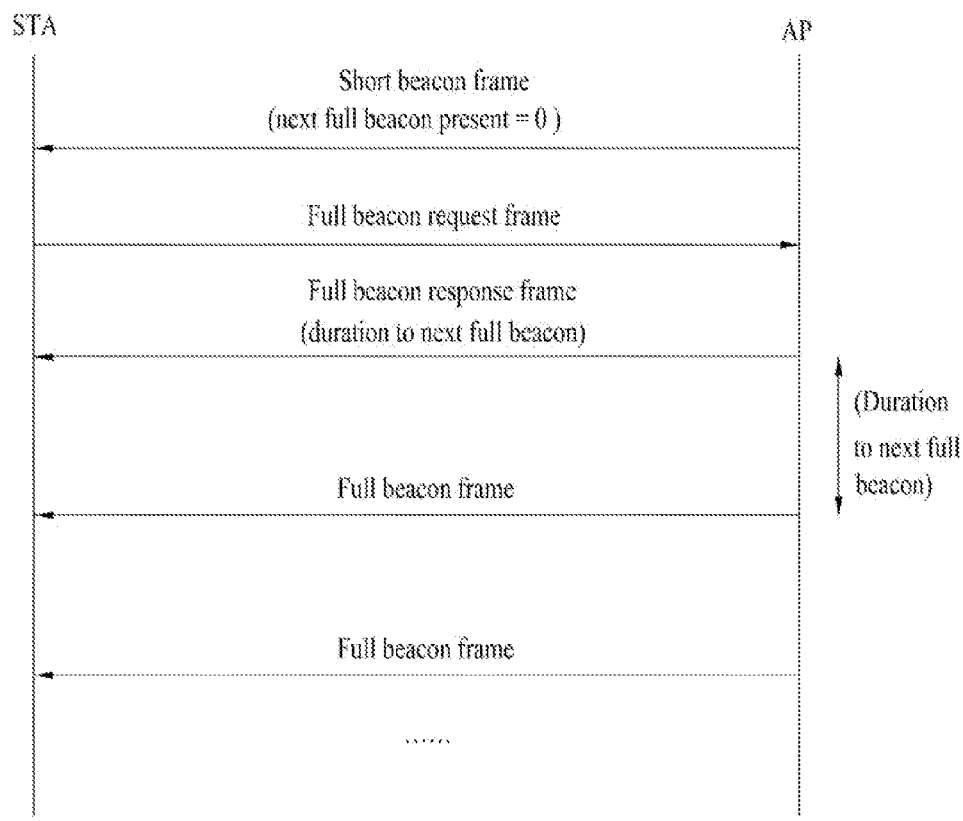
FIG. 20 is a diagram illustrating a method for transmitting and receiving a full beacon frame according to another embodiment of the present invention.

FIG. 20 is a diagram illustrating a method for transmitting and receiving a full beacon frame according to another embodiment of the present invention.

As described above with reference to FIG. 18, when the AP cannot immediately start to transmit the full beacon frame upon reception of the full beacon request frame from the STA, the AP can transmit the full beacon response frame to the STA. The full beacon response frame may include information (e.g. the duration to next full beacon field or next TBTT field) used for the STA to determine a transmission time of the next full beacon. Accordingly, the STA can determine a reception time of the next full beacon.

While the STA transmits the full beacon request frame to the AP to request the AP to transmit the full beacon in the examples of FIGS. 19 and 20, the STA may request the AP to transmit the full beacon through the probe request frame. That is, the STA can request the AP to transmit the full beacon by transmitting the probe request frame to the AP upon determining that the AP does not transmit the full beacon. To this end, the probe request frame may include information indicating that the STA requests transmission of the full beacon frame. Upon reception of the probe request frame including the information, the AP may transmit the full beacon frame to the STA and, when the AP cannot immediately transmit the full beacon frame, may provide information used for the STA to determine a time when the next full beacon can be received by the STA by transmitting the probe response frame.

That is, the STA can transmit the full beacon request frame/probe request frame to the AP in order to request the full beacon frame upon determining that the AP does not transmit the full beacon frame. In response to the full beacon request frame/probe request frame, the AP can transmit the full beacon frame/full beacon response frame/probe response frame.

Here, the AP can transmit the full beacon response frame/probe response frame to the STA in a unicast or broadcast manner.

Figure 21:
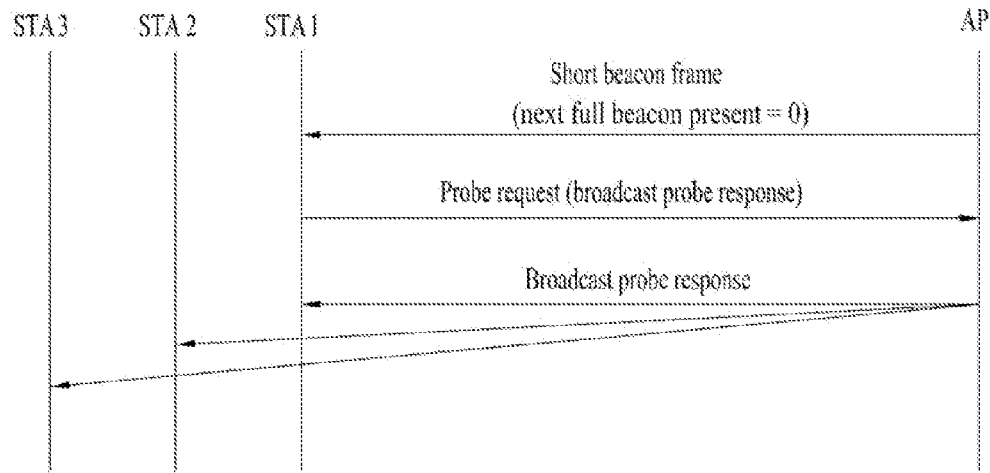
FIG. 21 is a diagram illustrating transmission of a probe response frame in a broadcast manner.

FIG. 21 is a diagram illustrating broadcast transmission of the probe response frame.

In conventional wireless LAN systems, the probe response frame is transmitted as a response to the probe request frame in a unicast manner only for an STA that has transmitted the probe request frame. However, since the probe response frame may provide information on a transmission time of the next full beacon, like the full beacon response frame, as proposed in the present invention, it may be appropriate to broadcast the probe response frame.

Information that indicates/requests transmission of the probe response frame in a broadcast manner (information indicating broadcast of probe response in the example of FIG. 21) may be included in the probe request frame. In this case, the AP can transmit the probe response frame in a broadcast manner.

For example, the value of a reception address field of the probe response frame can be set to a broadcast identifier (e.g. a wildcard). In addition, a most robust modulation and coding method (e.g. quadrature phase shift keying (QPSK) 1/12, 2 repetition) can be applied to data of the probe response frame transmitted in a broadcast manner such that all STAs in a BSS can receive the data.

Embodiment 3

Since the full beacon including the system information is periodically transmitted in conventional wireless LAN operation, an STA can obtain changed system information by receiving the next full beacon when the system information has been changed. However, when the full beacon including the system information is not periodically transmitted or the full beacon is not transmitted and only the short beacon is transmitted, the STA cannot immediately update the system information even when the system information has been changed.

The present invention proposes a method for updating changed system information by the STA when the system information has been changed in a system in which the full beacon is not transmitted.

In a wireless LAN system (e.g. IEEE 802.11ah system) using the short beacon frame, the full beacon frame may be defined such that the full beacon frame includes information indicating whether the system information is changed.

Figure 22:
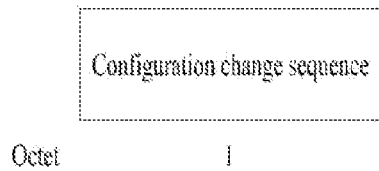
FIG. 22 illustrates a change sequence field.

The information indicating whether the system information is changed may be defined as a change sequence field or configuration change sequence field, as shown in FIG. 22. The change sequence field may be set to a value indicating whether the system information is changed. Specifically, when system information (e.g. non-dynamic system information) other than dynamic elements (dynamic system information) such as timestamp information is changed, the change sequence field is defined such that the value thereof increments by 1 and may have a value in the range of 0 to 255 (that is, modulo 256 is applied). As described above, the change sequence field may be call the (AP) configuration change count (CCC) field since the change sequence field is counted by 1 whenever the system information is changed.

When the change sequence value included in the beacon frame or probe response frame is maintained as the same as a previous value, the STA can immediately determine that the remaining fields included in the beacon frame or probe response frame have not been changed and may disregard the remaining fields. However, the STA can operate to obtain dynamic information such as a timestamp value even when the change sequence value has not been changed.

According to the present invention, the probe response frame may be defined such that information (e.g. change sequence field) indicating whether the system information has been changed is included therein. That is, when the AP transmits the probe response frame as a response to the probe request frame transmitted from the STA, the AP can include a change sequence, which corresponds to the system information included in the probe response frame, in the probe response frame and transmit the probe response frame.

Accordingly, when the STA acquires the system information through the full beacon frame or the probe response frame, the STA can store the change sequence value associated with the acquired system information along with the system information. Thereafter, when the STA receives the short beacon frame or the full beacon frame, the STA can compare the change sequence value stored therein with a change sequence value included in the short beacon frame or the full beacon frame. When the two values are identical to each other, the STA can determine that the system information has not been changed. When the two values differ from each other, the STA can update the changed system information.

Here, when the full beacon frame is transmitted, the STA can obtain the changed system information through the full beacon frame. However, the STA cannot obtain the changed system information through the full beacon frame when the full beacon frame is not transmitted. Accordingly, the following procedure may be performed in order to update the changed system information when the full beacon frame is not transmitted.

Embodiment 3-1

The present embodiment relates to a method for updating system information using a probe request/response procedure.

The conventional probe request/response procedure is performed for active scanning when an STA discovers an AP. The present invention proposes use of the probe request/response procedure for system information update. That is, while the conventional probe request/response procedure is performed in order to associate an STA that is not associated with an AP with the AP, an STA associated with the AP can transmit a probe request to the AP and receive a probe response from the AP for system information update according to the present invention.

Figure 23:
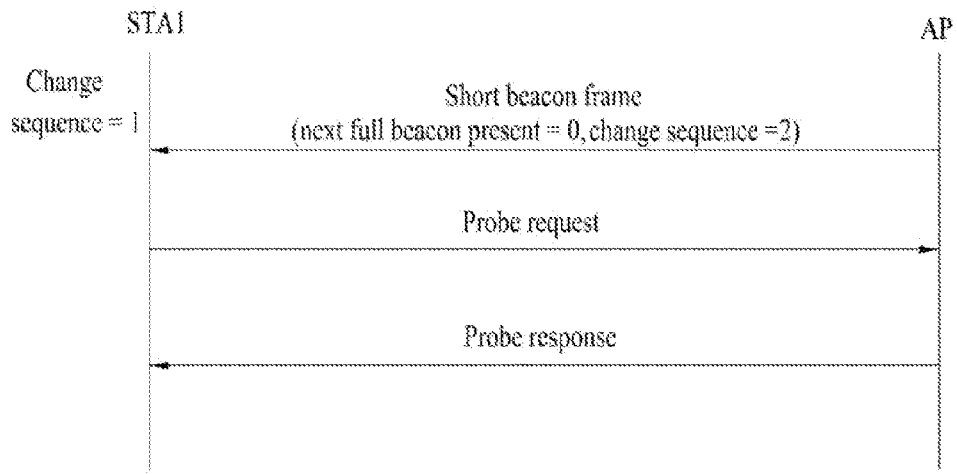
FIG. 23 is a diagram illustrating a probe request/response procedure according to an embodiment of the present invention.

FIG. 23 is a diagram illustrating a probe request/response procedure according to an embodiment of the present invention.

An STA associated with the AP may receive a short beacon and then confirm whether system information has been changed by checking a change sequence value. When a change sequence value stored in the STA is 1 whereas the change sequence value included in the short beacon is 2, as shown in FIG. 23, the STA can determine that the system information has been changed.

In this case, the STA can transmit the probe request frame to the AP. Here, the probe request frame may further include information indicating that the probe request frame is a probe request frame for updating the system information.

The AP can transmit the probe response frame to the STA in response to the probe request frame from the STA. Here, the AP can include current system information (i.e. updated/changed system information) in the probe response frame and provide the probe response frame to the STA.

Even if one STA in the corresponding BSS transmits the probe request for system information update, the probe response frame may be transmitted in a broadcast manner for system information update of other STAs in the BSS, instead of being transmitted to the one STA in a unicast manner since the changed system information needs to be commonly applied to all STAs in the BSS.

Figure 24:
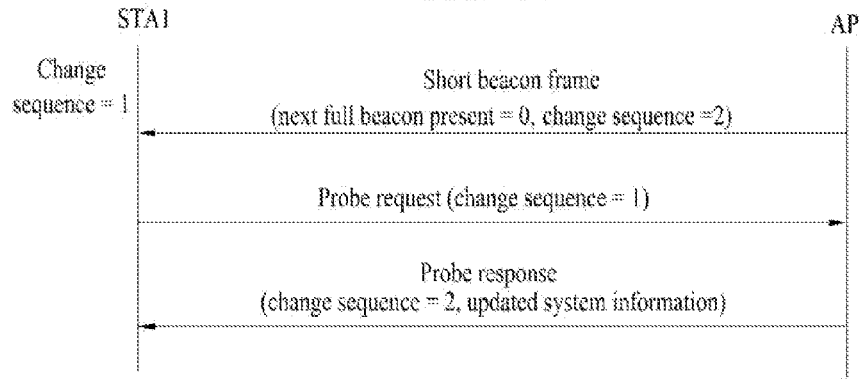
FIG. 24 is a diagram illustrating a probe request/response procedure according to another embodiment of the present invention.

FIG. 24 is a diagram illustrating a probe request/response procedure according to another embodiment of the present invention.

The aforementioned probe response frame may include all system information elements. That is, all current network information elements can be provided to the STA irrespective of previous system information stored in the STA. This is because it is appropriate for the system information provided through the full beacon to include all system information elements since the system information is for all STAs in the BSS rather than a specific STA, and the conventional probe response is appropriate when an STA does not have information regarding a corresponding network since the probe response is provided for initial association of the STA with the network.

However, it is more desirable to provide system information more efficiently when an STA, which has associated with the AP and stored information (i.e. information before change) of the corresponding network, performs operation for system information update, as proposed by the present invention. That is, since provision of the same system information as system information prestored in the STA through the probe response frame is unnecessary and may waste resources, it is necessary to prevent redundant provision of the system information.

Accordingly, the present invention provides provision of only a part of current system information (i.e. only one or more elements of system information that needs to be updated by the STA), which has been changed from system information (i.e. previous system information) prestored in the STA. A probe response frame including only information regarding a system information change may be referred to as an optimized probe response frame.

Referring to FIG. 24, when a change sequence value prestored in the STA is 1 and a change sequence value included in the short beacon from the AP is 2, the STA can determine that the system information has been changed.

When the STA transmits the probe request frame for system information update, the STA may include the change sequence value stored therein in the probe request frame and transmit the probe request frame. In addition, the STA may further include information, which indicates that the probe request frame is a probe request frame for system information update, in the probe request frame.

When the probe request frame received by the AP includes the change sequence value (or when the probe request frame includes the information indicating that the change sequence value and the probe request frame are for system information update), the AP can compare current system information with the system information (i.e. system information corresponding to the change sequence value stored in the STA) stored in the STA. Upon comparison, the AP can select only a changed part of the system information, include the selected part in the probe response frame and provide the probe response frame to the STA. When the AP receives the probe request frame including a change sequence value of 1 in the example of FIG. 24, the AP can include, in the probe response frame, only a current value regarding changed system information element(s) in a change sequence value of 2 and transmit the probe response frame to the STA.

Figure 25:
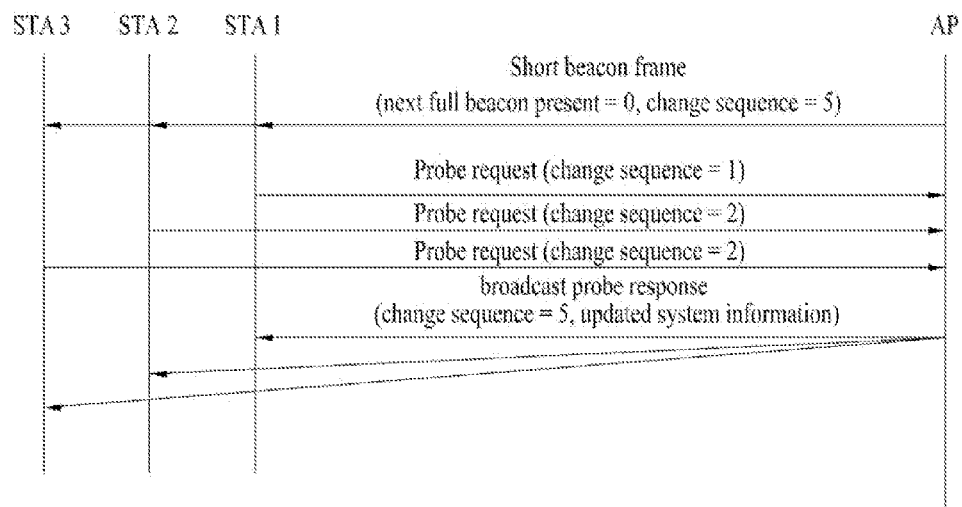
FIG. 25 is a diagram illustrating a probe request/response procedure according to another embodiment of the present invention.

FIG. 25 is a diagram illustrating a probe request/response procedure according to another embodiment of the present invention.

In the example of FIG. 25, the short beacon frame transmitted from the AP may be broadcast to a plurality of STAs, i.e. STA1, STA2 and STA3. Here, it is assumed that a change sequence value included in the short beacon frame is 5 and change sequence values corresponding to system information prestored in STA1, STA2 and STA3 are 1, 2 and 2, respectively.

Accordingly, the plurality of STAs can determine that the system information has been changed and transmit probe request frames including change sequence fields set to the values prestored therein, to the AP.

In the example of FIG. 25, the AP can transmit probe response frames including changed system information (i.e. system information corresponding to change sequence=5) in a broadcast manner upon reception of the probe request frames. The probe response frames transmitted in a broadcast manner may include all information elements of the current system information.

Alternatively, the AP may transmit the probe response frame to each of the plurality of STAs individually (i.e. in a unicast manner) upon reception of the probe request frames from the plurality of STAs. In this case, the system information included in the probe response frame for each STA may include only a part changed from the system information stored in the corresponding STA. For example, the probe response frame transmitted to STA 1 can include only system information (i.e. current value of changed information element(s) in one or more of change sequence values of 2, 3, 4 and 5) corresponding to the change sequence value of 5, which is changed from system information corresponding to the change sequence value of 1. For example, the probe response frame transmitted to STA 2 or STA 3 can include only system information (i.e. current value of changed information element(s) in one or more of change sequence values of 3, 4 and 5) corresponding to the change sequence value of 5, which is changed from system information corresponding to the change sequence value of 2.

Upon reception of the probe request frames for system information update from the plurality of STAs, the AP can determine whether to transmit the probe response frames in a broadcast or unicast manner, in consideration of the quantity of system information, the number of STAs that request system information update, system congestion state and the like.

Embodiment 3-2

Operation similar to the system information update method using the probe request frame/probe response frame, described in embodiment 3-1, may be performed using new request/response frames. The new request/response frames may be referred to as a system information update request frame and a system information update response frame. Otherwise, the new request/response frames may be referred to as a system information (SI) update request frame and an SI update response frame. However, the scope of the present invention is not limited to the names of the new request/response frames and includes request/response frames in different names, used for operations provided by the present invention.

Figure 26:
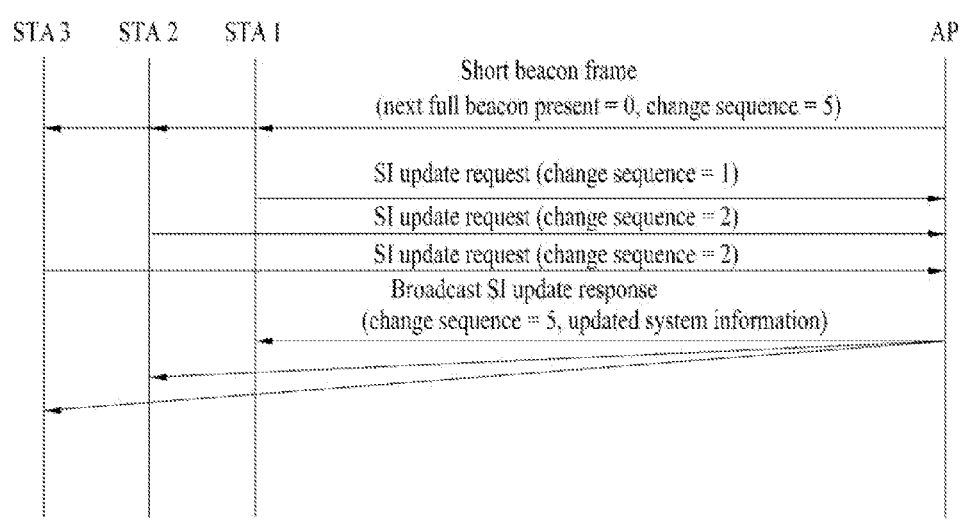
FIG. 26 is a diagram illustrating an SI update request/response procedure according to an embodiment of the present invention.

FIG. 26 is a diagram illustrating an SI update request/response procedure according to an embodiment of the present invention.

The example of FIG. 26 corresponds to the example of FIG. 25 except that the probe request frame is replaced by the SI update request frame and the probe response frame is replaced by the SI update response frame, and thus redundant description is omitted.

Embodiment 3-3

Figure 27:
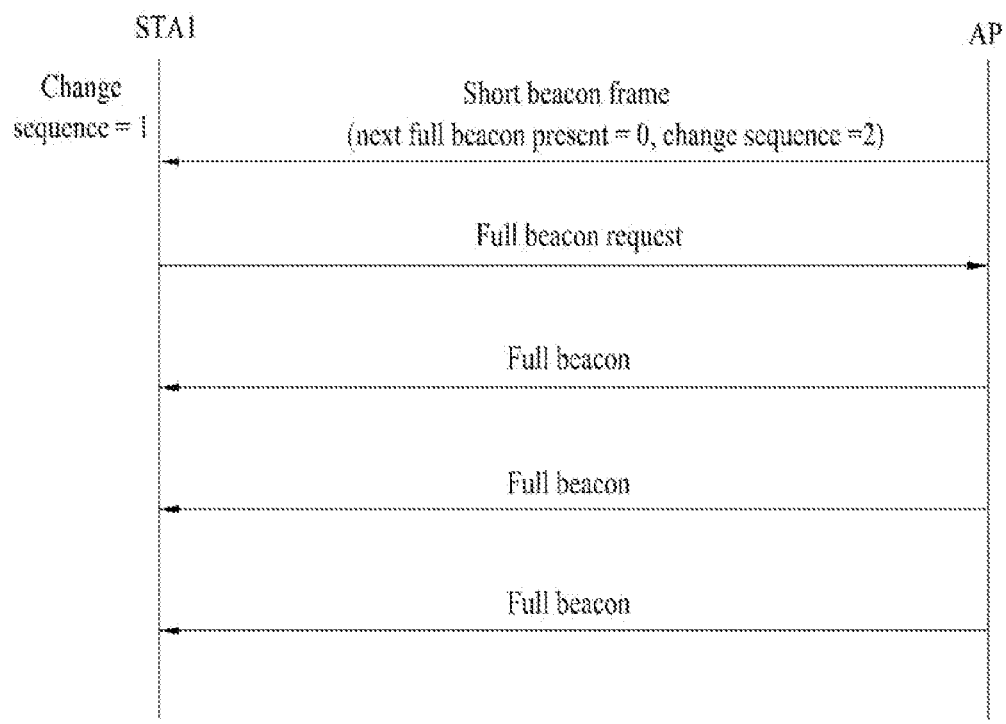
FIG. 27 is a diagram illustrating a method for updating system information using a full beacon request frame.

FIG. 27 is a diagram illustrating a method for updating system information using a full beacon request frame.

The example of FIG. 27 is discriminated from the example of FIG. 19 in that the STA transmits the full beacon request frame in consideration of a change sequence value included in the short beacon frame.

Specifically, when the change sequence value included in the short beacon frame differs from the change sequence value stored in the STA in the example of FIG. 27, the STA can determine that the system information has been changed. Accordingly, the STA can transmit the full beacon request frame to the AP. That is, the STA may not transmit the full beacon request frame if the system information is not changed even when the STA determines that the AP does not transmit the full beacon frame.

Upon reception of the full beacon request frame, the AP can start to transmit the full beacon frame in response to the full beacon request frame. For example, the AP can periodically transmit the full beacon frame for a predetermined time or a predetermined number of times after receiving the full beacon request frame from the STA. The predetermined time/predetermined number of times may be set according to a value requested by the STA or on the basis of a value predetermined according to system characteristics.

Embodiment 4

As proposed in the aforementioned embodiments, the AP can transmit a response frame (e.g. probe response frame or SI update response frame) including a current value of information element(s) changed in the current system information with reference to the change sequence value of the STA upon reception of a request frame (e.g. probe request frame or SI update request frame) including the change sequence value of the STA, from the STA.

To determine part of the current system information, which has been changed from the previous system information (e.g. system information stored in the STA), and transmit the part, the AP needs to store system information corresponding to the previous change sequence value. Here, the AP can store only the element ID of a changed information element (IE) of the system information rather than storing the changed IE of the system information.

Element IDs of changed IEs in system information can be provided as shown in Table 1.

TABLE 1

| Information Element | Element ID |
|---|---|
| Inclusion of a Channel Switch Announcement | 37 |
| Inclusion of an Extended Channel Switch Announcement | 60 |
| Modification of the EDCA parameters | 12 |
| Inclusion of a Quiet element | 40 |
| Modification of the DSSS Parameter Set | 3 |
| Modification of the CF Parameter Set | 4 |
| Modification of the FH Parameter Set | 8 |
| Modification of the HT Operation element | 45 |
| Modification of the Channel Switch Assignment | 35 |
| . . . | . . . |

When the element IDs of changed IEs are provided as shown in Table 1, change sequence values stored in the AP can be mapped to the element IDs of changed IEs according to system information change.

For example, it is assumed that EDCA parameter is changed in change sequence 1, CF parameter is changed in change sequence 2, HT operation element is changed in change sequence 3 and EDCA parameter is changed in change sequence 4. In this case, the AP can map the change sequence values to the element IDs corresponding to the changed IEs and store the change sequence values and the element IDs. That is, the AP can store a list (referred to as a change sequence list or configuration change count list hereinafter) regarding system information change, as shown in Table 2.

TABLE 2

| Change sequence = 1 | Element ID = 12 |
| Change sequence = 2 | Element ID = 4 |
| Change sequence = 3 | Element ID = 45 |
| Change sequence = 4 | Element ID = 12 |

As shown in Table 2, the ID of one IE can be mapped to one change sequence and stored. When change sequence information is 1 byte (i.e. information capable of representing the number of 256 cases) and element ID information mapped thereto is also 1 byte, a storage space of 2 bytes is necessary to represent one element ID mapped to one change sequence.

When it is assumed that the system information is changed according to the aforementioned example, system information update operation can be performed as follows.

Assuming that the STA transmits a request frame (e.g. probe request frame or SI update request frame) including change sequence=2 and a change sequence value corresponding to the current system information of the network is 4, the AP can determine system information (i.e. element ID=45 and 12 in Table 2) which has been changed from system information of change sequence of 2. Accordingly, the AP can include an HT operation element and EDCA parameter respectively corresponding to element IDs 45 and 12 in a response frame (e.g. probe response frame or SI update response frame) and transmit the response frame to the STA.

As described above, the AP can store the change sequence list (or configuration change count (CCC) list) in which change sequence values are mapped to IDs of changed system information at the change sequence values.

When the AP maps the ID of a changed element to a change sequence value and stores the mapped values whenever system information is changed, memory overhead of the AP may increase. For example, when change sequence information is 1 byte and element ID information is 1 byte, a storage space of 512 bytes is necessary to store element ID information mapped to 256 different change sequence values. However, information regarding change of old system information (i.e. change sequence values and element IDs mapped thereto) may be unnecessary since system information is not frequently changed in general. That is, when the AP maintains a storage space of 512 bytes all the time in order to store information regarding system information change, unnecessary overhead can be generated in the memory of the AP.

Accordingly, to reduce overhead for storing information regarding system information change in the AP, the number of pieces of stored information, that is, change sequence lists can be refreshed or restricted according to conditions such as time, the number of change sequences and the like.

For example, the AP can limit the stored information according to time. Specifically, the AP can determine a unit of a predetermined period (e.g. a few minutes, a few hours, a few days, a few months, a few years or the like), retain stored information only for the corresponding period and delete expired information. For example, when the information (i.e. change sequence values and element ID values mapped thereto) regarding system information change is retained for month, the AP may not retain the information regarding system information change after one month. In this case, the size of the storage space necessary for the AP to store the information regarding system information change is not uniform. For example, while a 2-byte storage space is necessary when the system information has been changed once in the last month, a 20-byte storage space is necessary when the system information has been changed ten times in the last month. However, when the stored information is limited according to time, system information management stability can be improved since previous system information is not lost even when the system information is frequently changed.

Alternatively, the AP may limit the stored information according to the number of change sequences. The number of pieces of retained information can be set to 4, 8, 12, 16 . . . , for example. It is assumed that the AP is configured to retain only information corresponding to latest 8 change sequences and a change sequence value of current system information is 16. In this case, the AP may retain change sequences of 9, 10, . . . , 16 and element IDs mapped thereto but may not retain or may delete information regarding change of the previous system information (i.e. change sequences of 8, 7, 6, 5, . . . and element IDs mapped thereto). Here, the storage space necessary for the AP to store the information regarding system information change can be maintained as 16 bytes. Accordingly, system information management efficiency can be improved.

In the aforementioned method of storing the information regarding system information change, the conditions of time and the number of pieces of stored information may be simultaneously applied. For example, system information can be managed using a flexible storage space of less than 20 bytes by limiting a maximum number of pieces of stored information to 10 while storing information regarding system information change for the last month.

Embodiment 5

When the STA according to the present invention has received system information and change sequence information from the AP associated therewith through at least one of the full beacon, probe response frame and system information response frame, the STA may continuously store the system information and change sequence information of the associated AP even after dissociating from the AP. By storing the system information and change sequence information of the dissociated AP, the STA can perform fast initial ink setup (FILS) when re-associated with the dissociated AP. A description will be given of examples of performing fast initial link setup by storing system information and change sequence information on a dissociated AP during active scanning and passive scanning with reference to FIGS. 28 and 29.

Figure 28:
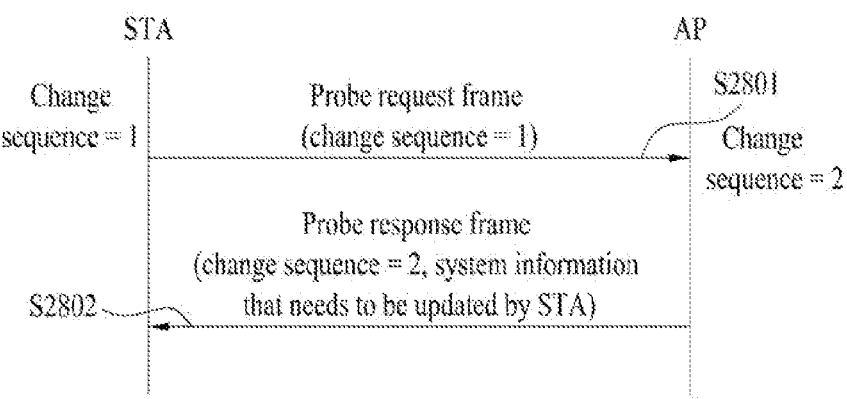
FIG. 28 is a diagram illustrating an example of performing fast initial link setup during active scanning.

FIG. 28 is a diagram illustrating an example of performing fast initial link setup during active scanning.

When an STA performs active scanning for a target AP (or BSS), the target AP is an AP with which the STA was associated, and the STA stores system information and change sequence information on the target AP, the STA can configure a probe request frame such that the probe request frame includes the change sequence information (S2801).

Upon reception of the probe request frame including the change sequence information, the AP can compare current system information with system information (i.e. system information corresponding to the change sequence value stored in the STA) stored in the STA. When the change sequence value received from the STA differs from a current change sequence value of the AP, the AP can include changed parts of various pieces of system information in a probe response frame and provide the probe response frame to the STA (S2802).

For example, when the change sequence value (=1) received from the STA corresponds to a previous change sequence value instead of the current change sequence value (=2) in the change sequence list in FIG. 28, the AP can include, in the probe response frame, only a current value (i.e. current value of system information element(s), which has been changed from the previous change sequence (=1), in the current change sequence (=2)) of system information element(s) that needs to be updated and transmit the probe response frame to the STA.

As described above, it is possible to reduce the size of the probe response frame by including only changed system information, instead of whole system information, in the probe response frame, thereby resulting in fast initial link setup.

When the change sequence list stored in the AP does not have a value corresponding to the change sequence value received from the STA, the AP cannot be aware of system information that has been changed. Accordingly, the AP may configure a probe response frame including the whole system information and the current change sequence value. Here, system information that can be included in the probe response frame may be limited to only non-dynamic elements or to non-dynamic elements and some dynamic elements. For a detailed description of the non-dynamic elements and dynamic elements, refer to embodiment 5-1 which will be described later.

FIG. 29 is a diagram illustrating an example of performing fast initial link setup during passive scanning.

An STA that performs passive scanning may receive a short beacon including change sequence information from the AP (S2910). If the AP was associated with the STA and system information and change sequence information on the AP have been stored in the STA, then the STA may compare the change sequence information received from the AP with the change sequence information stored therein so as to determine whether the system information has a changed part. When the change sequence value stored in the STA is identical to the change sequence value (i.e. current change sequence value) received from the AP, the STA can be associated with the AP using the system information stored therein without receiving a full beacon.

Conversely, when the change sequence value stored in the STA differs from the change sequence value (i.e. current change sequence value) received from the AP, the STA can obtain system information from the AP by receiving a full beacon frame at a full beacon transmission time (S2902a), as shown in FIG. 29(a), or by receiving a probe response frame in response to a probe request frame, as shown in FIG. 29(b).

The full beacon transmission time may be indicated by the duration to next full beacon field included in the short beacon, as described above with reference to FIGS. 19 and 20, the full beacon transmission time is not limited thereto.

When the STA receives the system information through the probe request frame and the probe response frame, the STA can transmit the probe request frame including the change sequence value stored therein (S2902b). When the change sequence value received from the STA differs from the change sequence value stored in the AP, that is, when the change sequence value received from the STA is identical to a previous change sequence value instead of the current change sequence value, the AP may include, in the probe response frame, only a current value of system information element(s), which have been changed from the previous change sequence (=1), in the current change sequence (=2) and transmit the probe response frame to the STA (S2902b). The AP may configure the probe response frame such that the probe response frame includes the whole system information irrespective of the change sequence value.

If a change sequence list stored in the AP does not include a value corresponding to the change sequence value received from the STA, then the AP cannot be aware of which system information has been changed. Accordingly, the AP may configure the probe response frame such that the probe response frame includes the whole system information and the current change sequence value. Here, the system information that can be included in the probe response frame may be limited to non-dynamic elements only or non-dynamic elements and some dynamic elements.

When the STA stores the system information and change sequence information on the disassociated AP, as described above, the STA can receive only changed system information through exchange of the probe request frame and the probe response frame (when the stored change sequence value differs from the received change sequence value) or perform fast initial ink setup by omitting reception of the full beacon (when the stored change sequence value is identical to the received change sequence value).

To this end, the STA can continuously store the system information element(s) and change sequence information, which have been received through the probe response frame or beacon frame (short beacon or full beacon) from the AP, even after the STA is dissociated from the AP.

Furthermore, the AP can store previous change sequence information and changed system information whenever system information is changed. Here, the AP can store only the ID of a changed information element (IE) instead of the changed IE.

For example, if a channel switch assignment information element has been changed (added or deleted) when the change sequence value=0, then the AP can increment the change sequence value by 1, associate the change sequence value with the ID of the channel switch assignment information element and store the associated change sequence value and channel switch assignment information element ID. For example, the AP can store data such as [change sequence=1, channel switch assignment information element ID=35] when IDs of information elements shown in Table 1 are used. On the same principle, if an EDCA parameter set information element has been changed (added or deleted) when the change sequence value=1, then the AP can store data such as [2, 12] as a [change sequence, system information element] pair. If an HT operation information element has been changed (or added) when the change sequence value=2, then the AP can store data such as [3, 45] as a [change sequence, system information element] pair. As described above, the AP can generate and store a change sequence list (or configuration change count list (CCC)) in which change sequence values are mapped to IDs of system information changed at the corresponding change sequence values.

When the ID of a changed information element is mapped to a corresponding change sequence value and stored whenever system information is changed, memory overhead of the AP may increase. Accordingly, the number of stored information elements, that is, change sequence lists may be refreshed or restricted according to conditions such as time, the number of information elements and the like.

Since the example of restricting the number of stored information elements according to time or the number of information elements has been described in embodiment 4, detailed description thereof is omitted.

Embodiment 5-1

Information elements of system information can be classified into time-invariant non-dynamic elements (or fixed elements) and time-variant dynamic elements. Specifically, a timestamp, BSS load, beacon timing of neighbor STAs, time advertisement, BSS access category (AC), BSS AC access delay, BSS average access delay, BSS available admission capacity and TPC report element (TPC report element can be changed twice to five times per day) can correspond to dynamic elements.

Since the dynamic elements vary with time, increasing the change sequence value (or configuration change count value) due to dynamic element change may be inefficient. Accordingly, the AP may increase the change sequence value (or configuration change count value) only when system information corresponding to an element (i.e. non-dynamic element) other than the dynamic elements has been changed.

Accordingly, the AP can compare the change sequence value transmitted from the STA with the change sequence value stored in the AP and determine whether to include a non-dynamic element in the probe response frame. A dynamic element may be included in the probe response frame or short beacon frame by default and transmitted.

That is, dynamic elements that cannot affect the change sequence value are included in the probe response frame or short frame, whereas non-dynamic elements that affect the change sequence value are selectively included in the probe response frame through comparison of the change sequence value stored in the STA and the change sequence value stored in the AP.

However, when all dynamic elements are included in the probe response frame or short beacon frame, overhead of the probe response frame or short beacon frame may excessively increase. Accordingly, the AP may include important information (e.g. timestamp and BSS load) for AP selection in the probe response frame or short beacon frame, transmit the probe response frame or short beacon frame to the STA, and additionally transmit the remaining dynamic elements (e.g. time advertisement, TPC report element and the like) to the STA in an authentication or association process.

Alternatively, the AP may transmit all dynamic elements to the STA in the authentication or association process without inserting any dynamic element into the probe response frame or short beacon frame.

That is, unnecessary overhead (i.e. overhead of the short beacon frame or probe response frame) in the scanning process can be reduced by transmitting at least part of dynamic elements to the STA through authentication or association so as to enable the STA to perform fast initial link setup.

The STA may retain only non-dynamic elements other than dynamic elements when retaining system information of a previously associated AP. Since the dynamic elements vary with time, it is more desirable to obtain the dynamic elements through the beacon frame (short beacon frame or full beacon frame) or probe response frame received from the AP or through authentication or association.

Embodiment 5-2

The STA may store system parameter(s) and configuration change count value (or change sequence value) of only a preferred AP from among previous associated APs. In this case, the AP can maintain an appropriate storage space for storing information regarding system information change to improve system information management efficiency.

To set an associated AP as a preferred AP, the STA may request the AP to set the STA as a preferred STA. FIG. 30 is a diagram illustrating a procedure of setting an associated AP as a preferred AP. The STA can request the associated AP to set the STA as a preferred STA. Here, the STA may request the associated AP to set the STA as a preferred STA by transmitting an existing request frame (e.g. association request frame) or a new request frame (e.g. short probe request frame, optimized probe request frame, FILS probe request frame, preferred STA request frame or the like) to the AP after link setup (i.e. scanning, authentication and association), as shown in FIG. 30.

Alternatively, the STA may request the associated AP to set the STA as a preferred STA by transmitting an existing request frame or a new request frame that includes a field indicating the request during the link setup procedure.

Upon reception of the request from the STA, the AP may reject or accept the request of the STA. When the AP rejects the request of the STA, the AP may notify the STA of rejection of the request of the STA by transmitting an existing response frame (e.g. association response frame) or a new response frame (e.g. short probe response frame, optimized probe response frame, FILS probe response frame, preferred STA response frame or the like). For example, when many STAs are registered as preferred STAs, the AP can reject the request of the STA. When the AP rejects the request of the STA, the AP may delete information of the STA (e.g. capability of the STA) when the STA is de-associated from the AP (refer to FIG. 30(a)).

When the AP accepts the request of the STA, the AP may store system information of the STA and system information about capability of the STA and notify the STA of acceptance of the request of the STA by transmitting an existing response frame or a new response frame. When the AP accepts the request of the STA, the AP can retain the information of the STA (e.g. capability of the STA) even if the STA is de-associated from the AP (refer to FIG. 30(b)).

Upon reception of the response frame indicating that the request of the STA has been accepted, the STA may set the AP as a preferred AP. Then, the STA may store system parameter(s) and a configuration change count value (or change sequence value) regarding the preferred AP even when the STA is disassociated from the AP.

When the STA stores the system parameter(s) regarding the preferred AP, the STA may include AP configuration change count information (or change sequence information) on the AP in the probe request frame and transmit the probe request frame to the AP when attempting active scanning for the preferred AP (or target AP).

Figure 31:
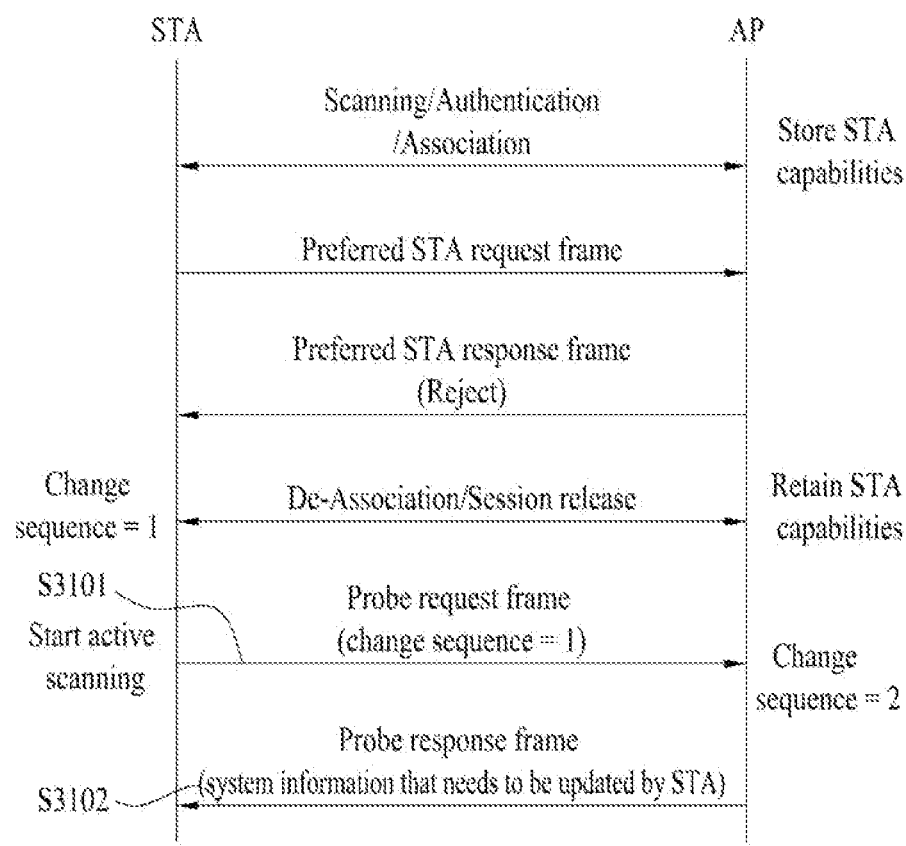
FIG. 31 illustrates an operation when active scanning is performed for a preferred AP which was dissociated.

FIG. 31 is a diagram illustrating operation when active scanning is performed on a previously de-associated preferred AP. As shown in FIG. 31, when the STA attempts active scanning for a preferred AP, the STA may include AP configuration change count information (or change sequence information) on the AP in the probe request frame and transmit the probe request frame to the AP (S3101).

Upon reception of the probe request frame including the configuration change count information from the STA, the AP may compare the received configuration change count value with a current configuration change count value and configure a probe response frame on the basis of the comparison result (S3102).

For example, when the received configuration change count value is identical to the current configuration change count value, the AP can exclude an optional information element and include, in the probe response frame, mandatory field(s) (e.g. timestamp, capability and beacon interval) or elements (i.e. frequency varying information elements (e.g. dynamic elements of system information) which are irrelevant to the change sequence value, along with the current AP configuration change count value (identical to the configuration change count value stored in the STA) and transmit the probe response frame including the mandatory field(s) or element and the current AP configuration change count value to the STA.

When the received configuration change count value differs from the current configuration change count value but corresponds to a previous configuration change count value, the AP may determine that a changed system parameter needs to be transmitted, include mandatory field(s) and an optional information element (i.e. the changed system parameter) in the probe response frame and transmit the probe response frame to the STA.

When a configuration change count list stored in the AP does not include the configuration change count value received from the STA, the AP cannot be aware of which system information has been changed. Accordingly, the AP may configure the probe response frame such that the probe response frame includes the whole system information and the current change sequence value. Here, system information that can be included in the probe response frame may be limited to non-dynamic elements only or the non-dynamic elements and some dynamic elements.

When the AP determines that the changed system parameter need not be transmitted to the STA even though the received configuration change count value differs from the current configuration change count value, the AP may exclude an optional information element and configure the probe response frame such that the probe response frame includes mandatory field(s) and the current AP configuration change count value.

Embodiment 5-3

As described above with reference to FIG. 5 and the related embodiments, when the STA performs active scanning for the preferred AP, the optimized probe request frame including only information regarding system information change can be used instead of the normal probe request frame.

The optimized probe request frame may be called a short probe request frame, FILS probe request frame or the like since the optimized probe request frame uses a smaller quantity of information than the normal probe request frame (the FILS probe request frame is used as a representative example in the present embodiment).

The FILS probe request frame can include one of the following information.

i) STA address (MAC address): An STA that performs active scanning can include the MAC address thereon in the FILS probe request frame.

ii) BSSID or partial BSSID: Since the STA knows address information of a preferred AP, the STA can include the corresponding BSSID or partial BSSID in the MAC PDU of the FILS probe request frame.

iii) Configuration change count information (or change sequence information) of a preferred AP: Configuration change count information indicates whether system information of the AP has been changed. The STA can store (retain) a configuration change count value, which was received from a previously associated preferred AP, even after de-association from the preferred AP and include the stored configuration change count value in the FILS probe request frame when performing active scanning for the preferred AP.

iv) STA capability which was transmitted through the probe request frame or optional information element(s) related to system information: When STA capability or optional information element(s) have been changed, the STA needs to notify the AP that the capability or optional information element(s) have been changed. Accordingly, when STA capability or optional information element(s) have been changed after de-association of the STA from the preferred AP, the changed information can be included in the FILS probe request frame.

However, the FILS probe request frame may not include the STA capability or optional information element(s) since the STA capability is not changed in general.

The FILS probe request frame will now be described in more detail with reference to the attached drawings.

Figure 32:
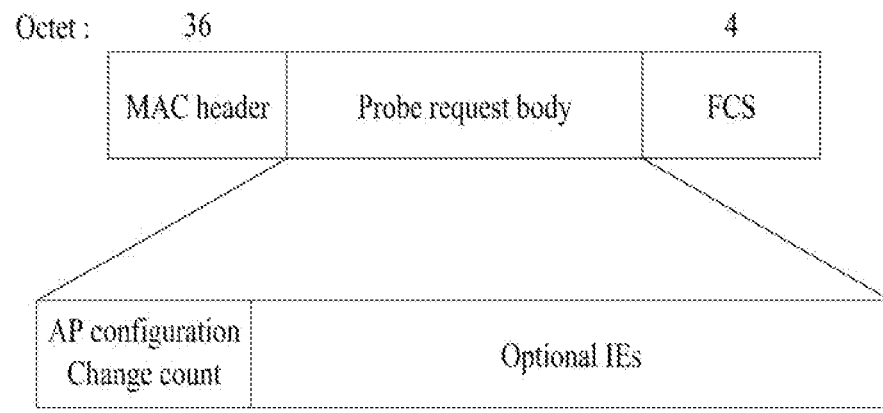
FIG. 32 illustrates an exemplary FILS probe request frame.

FIG. 32 illustrates an exemplary FILS probe request frame. Referring to FIG. 32, the FILS frame request frame may include MAC header, probe request body and FCS fields.

The address (MAC address) of the STA and BSSID (or partial BSSID) may be included in the MAC header.

The MAC header is 36 bytes and the FCS is 4 bytes. When 1-byte configuration change count information is included in the form of an information element in the probe request body, a 2-byte (element ID field (1 byte) and length field (1 byte) of the configuration change count field) overhead is added. Accordingly, a total overhead of the FILS probe request frame for including the 1-byte configuration change count information may be 42 bytes and the size of the MAC PDU of the FILS probe request frame including no optional information element(s) may be 43 bytes.

If the configuration change count value is always included in the FILS probe request frame as a default value instead of an information element, then the MAC PDU of the FILS probe request frame will become 41 bytes.

Figure 33:
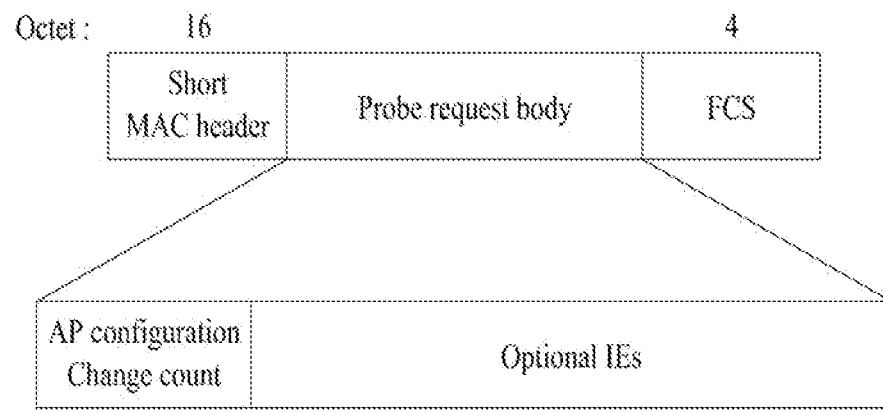
FIG. 33 illustrates an exemplary FILS probe request frame having a short MAC header applied thereto.
Figure 34:
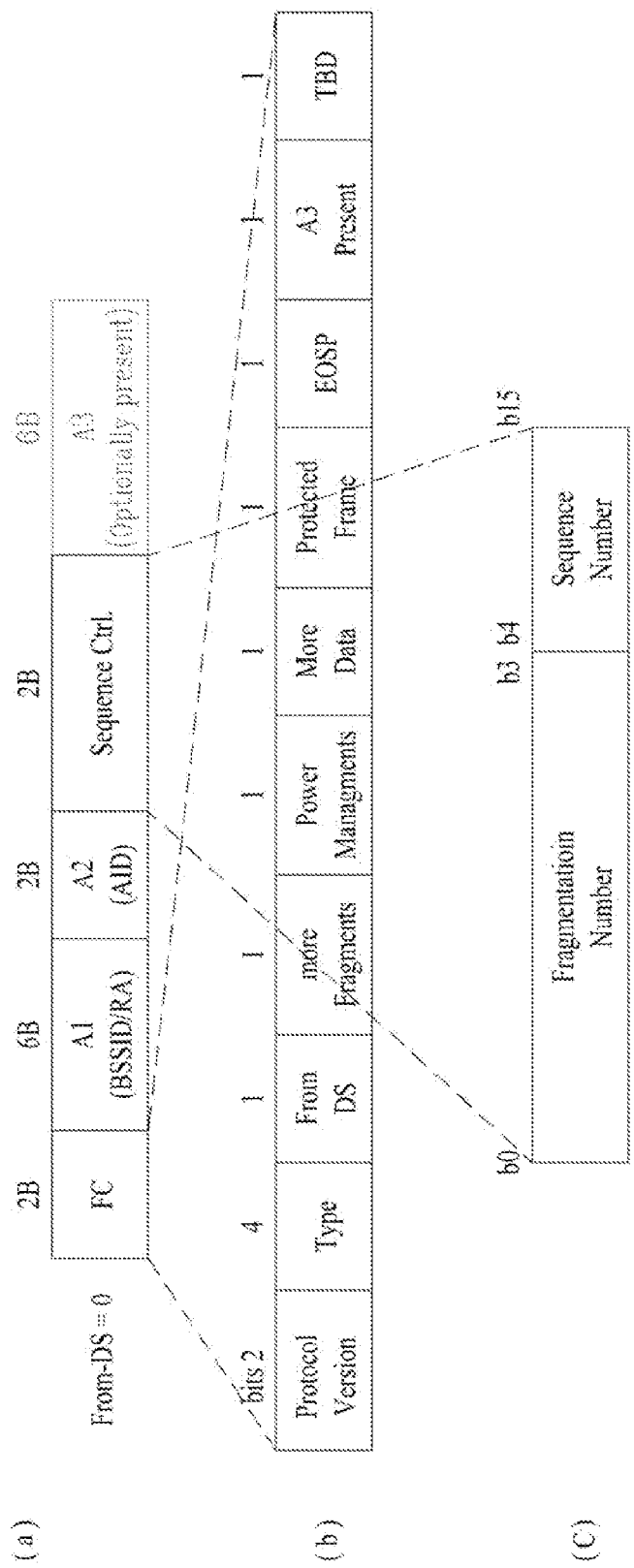
FIG. 34 illustrates a short MAC header.

To further reduce the overhead of the FILS probe request frame, a short MAC header may be used instead of the MAC header. FIG. 33 illustrates an exemplary FILS probe request frame to which the short MAC header is applied. Referring to FIG. 33, the FILS frame request frame may include short MAC header, probe request body and FCS fields. When the short MAC header is used, the overhead of the FILS probe request frame can be further decreased. FIG. 34 illustrates an example of the short MAC header.

FIG. 34 illustrates the short MAC header. Referring to FIG. 34, the short MAC header includes a frame control (FC) field, an AID field, a BSSID (or receiver address (RA)) field and a sequence control field and may selectively include an A3 field.

Sub-fields of the frame control field are shown in FIG. 34(b). The frame control field can indicate whether the MAC header is the short MAC header. Further, the frame control field can indicate whether the short MAC header includes the A3 field.

The positions of the AID field and BSSID field may be controlled according to a value of From-distribution system (DS) included in the FC field. Since the short probe request frame is transmitted to an AP in the same BSS to which the STA belongs, in general, From-DS will be set to "0". Accordingly, the BSSID field is disposed in A1 following the FC field and the AID of the STA is included in A2 in general. However, the positions are not limited thereto.

The short MAC header may further include a sequence control field. Sub-fields of the sequence control field are shown in FIG. 34(c).

When the short MAC header shown in FIG. 34 is used, the size of the short MAC header is 12 bytes, the size of the FCS field is 4 bytes, and a 14-byte overhead for including a 1-byte configuration change count value, including a 2-byte information element overhead of the configuration change count information, is generated in order to including a 1-byte configuration change count value, including a 2-byte information element overhead of the configuration change count information, is generated. The size of the MAC PDU of the FILS probe request frame can be 19 bytes. If the configuration change count information is included as a default value instead of an information element and optional information element(s) is not included, then the MAC PDU of the FILS probe request frame becomes 17 bytes.

The format of the short MAC header is not limited to the example of FIG. 34. FIG. 35 illustrates another exemplary MAC header. As shown in FIG. 35, the short MAC header may include a frame control field, a destination MAC address field, a source MAC address field, a sequence control field, a body field and an FCS field.

The destination MAC address field may include the BSSID (or partial BSSID) of the corresponding AP and the source MAC address field may include the MAC address of the corresponding STA. Whether the MAC header is the short MAC header can be indicated through the frame control field.

When the short MAC header shown in FIG. 35 is used, the size of the short MAC header is 16 bytes, the size of the FCS field is 4 bytes, and a 22-byte overhead including a 2-byte information element overhead regarding the configuration change count value is generated. The size of the MAC PDU of the FILS probe request frame can be 23 bytes. If the configuration change count value is included as a default value instead of an information element and optional information element(s) are not included, then the MAC PDU of the FILS probe request frame becomes 21 bytes.

The FILS probe request frame may be defined differently from that shown in FIG. 32. FIG. 36 illustrates another example of the FILS probe request frame. Referring to FIG. 36, the FILS probe request frame may include a frame control (FC) field, a destination address (DA) field, a source address (SA) field, a change sequence (or configuration change count) field, optional information element(s) and an FCS field.

Whether the probe request frame is the FILS probe request frame can be indicated through the FC field, specifically, type and sub-type fields of the FC field. For example, type=11 and sub-type=0010 can indicate that the probe request frame is the FILS probe request frame. Whether the probe request frame is the FILS probe request frame may be indicated using methods other than the type and sub-type fields.

The DA field may be set to the BSSID (or partial BSSID) and the SA field may be set to the MAC address of the STA.

When the FILS probe request frame shown in FIG. 36 is used, the MPDU of the FILS probe request frame can have a size of 13 bytes.

As described above with reference to FIG. 5 and the related embodiments, the AP can use the optimized probe response frame including only information that needs to be changed when transmitting system information to the STA. Since the optimized probe response frame includes a smaller quantity of information than the normal probe response frame, the optimized probe response frame may be called a short probe response frame, an FILS probe response frame or the like (the FILS probe response frame is used as a representative in the present embodiment).

FIG. 37 illustrates an example of the FILS probe response frame. As shown in FIG. 37, the FILS probe response frame may include a frame control field, a destination address field, a source address field, a timestamp field, a change sequence field (or configuration change count field), optional information element field and an FCS field.

Whether the probe response frame is the FILS probe response frame can be indicated through the frame control field.

The destination address field may include the MAC address of the corresponding STA and the source address field may include the BSSID (or partial BSSID) of the corresponding AP.

Since the timestamp is dynamic system information varying in real time, whether the timestamp has been changed is not indicated by the configuration change count. The STA can always obtain a timestamp value through the timestamp field of the FILS probe request frame irrespective of whether the configuration change count value has been changed.

The configuration change count field may include a change sequence value (or configuration change count value), which was obtained by the STA from a preferred AP when the STA was associated with the AP. While the configuration change count field may be included as a default value in the FILS probe response frame, as shown in FIG. 37, the configuration change count field may be included in the form of an information element (i.e. addition of the element ID field and length field of the change sequence field).

The optional information element field may include information elements of system information that needs to be updated by the STA. Furthermore, dynamic elements other than the timestamp, that is, system information that does not affect the configuration change count value, can be included in the optional information element field if the dynamic elements are supported by the AP. Specifically, the optional information element field may include a BSS load, beacon timing of neighbor STAs, time advertisement, BSS access category (AC), BSS AC access delay, BSS average access delay, BSS available admission capacity and TPC report element) (the TPC report element can be changed twice to five times a day) according to whether the AP supports the elements.

Figure 38:
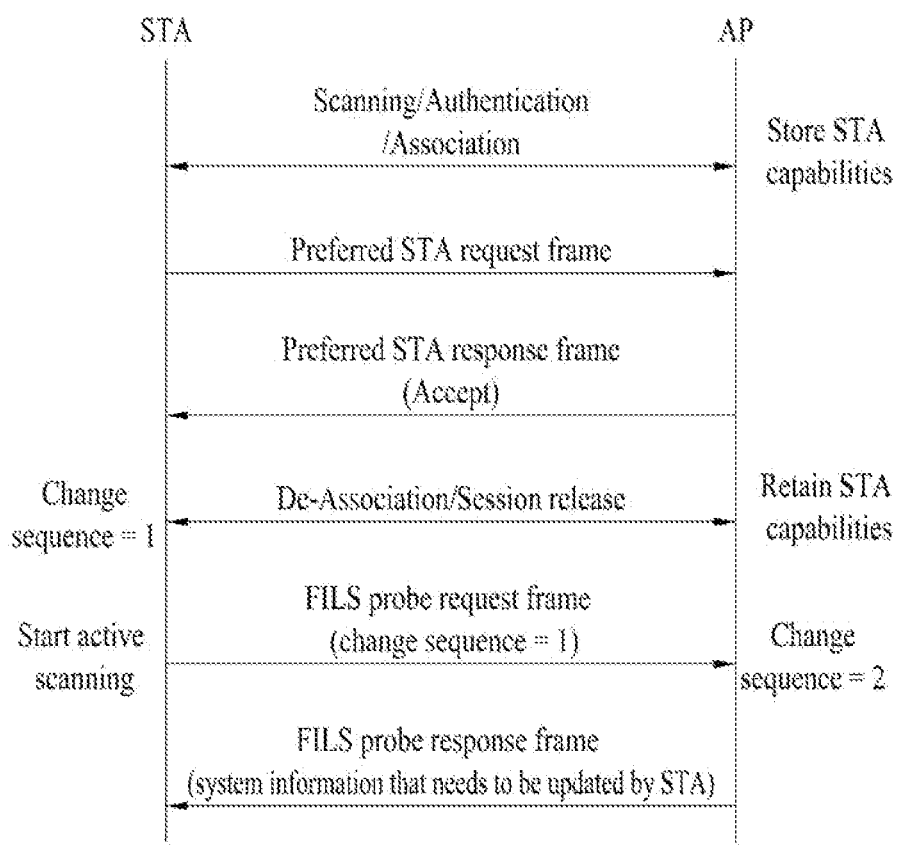
FIG. 38 is a diagram illustrating a system information update request/response procedure according to an embodiment of the present invention.

FIG. 38 is a diagram illustrating a system information update request/response procedure according to an embodiment of the present invention.

The example of FIG. 38 is identical to the example of FIG. 31 except that the probe request frame is replaced by the FILS probe request frame and the probe response frame is replaced by the FILS probe response frame, and thus description thereof is omitted.

Embodiment 5-4

An operation similar to the aforementioned system information update method using the probe request frame/probe response frame may be performed using new request/response frames, which are different from those described in embodiment 5-4. The new request/response frames can be referred to as system information update request/response frames. Otherwise, the new request/response frames may be referred to as system information (SI) update request/response frames. However, the scope of the present invention is not limited to the names of the new request/response frames and includes request/response frames in different names, which are used in operations proposed by the present invention.

The new request/response frames may have a null-data packet (NDP) frame format.

Embodiment 5-5

When the AP receives probe request frames including configuration change count values from one or more STAs, the AP may compare the received configuration change count values with a current configuration change count value and then unicast an appropriately configured probe response frame to an STA that needs system information update.

Figure 39:
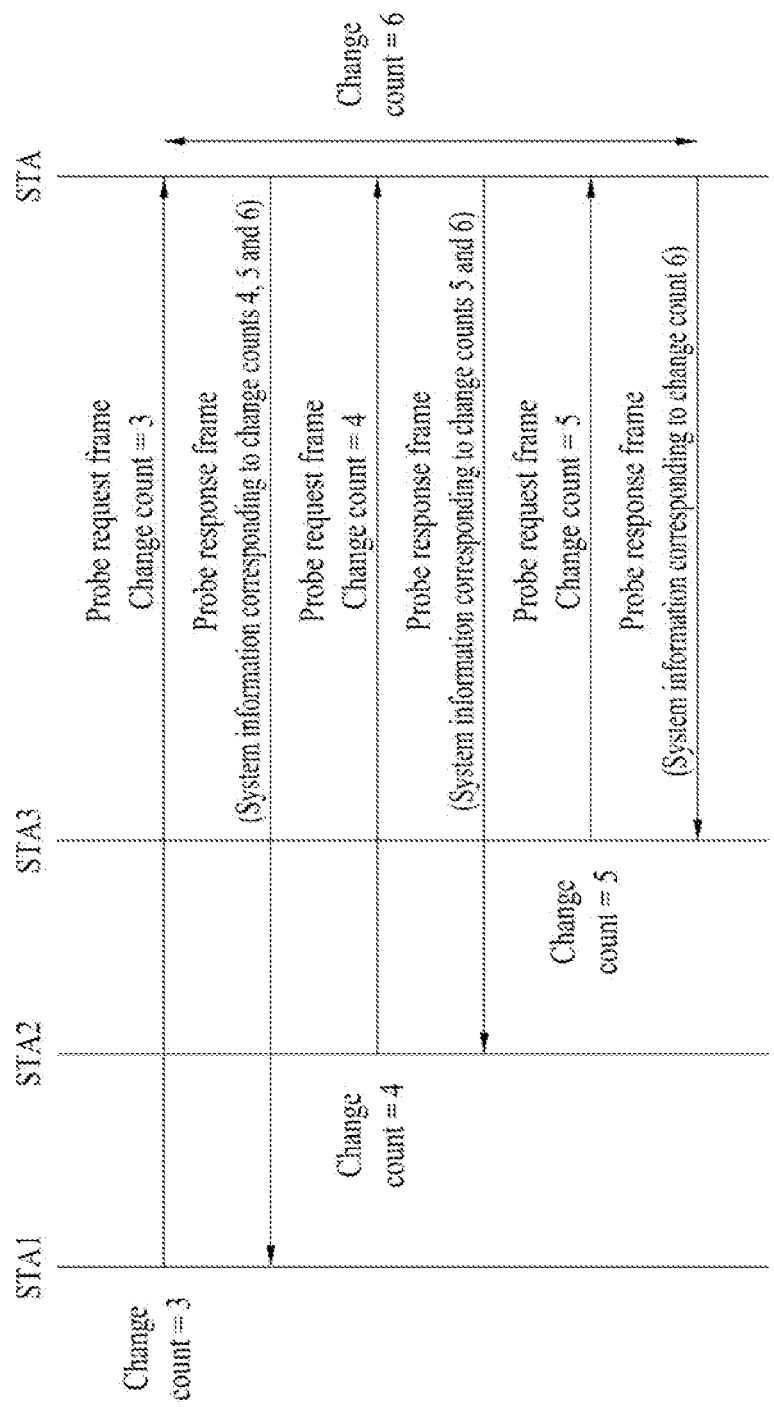
FIG. 39 illustrates an example of transmitting a probe response frame in a unicast manner.

FIG. 39 illustrates an example of unicasting the probe response frame. As shown in FIG. 39, when the current configuration change count value of the AP is 6 whereas configuration change count values received from STA 1, STA 2 and STA 3 are respectively 3, 4 and 5, the AP can unicast a probe response frame including system information corresponding to configuration change counts 4, 5 and 6 to STA 1, unicast a probe response frame including system information corresponding to configuration change counts 5 and 6 to STA 2 and unicast a probe response frame including system information corresponding to configuration change 6 to STA 3.

In the example shown in FIG. 39, however, the AP needs to transmit as many probe response frames as the number of STAs that have transmitted probe request frames even though redundant information (STAs 1, 2 and 3 need to commonly receive system information corresponding to configuration change count 6) is present.

Accordingly, the AP may include system information elements that need to be updated by respective STAs in one probe response frame and then broadcast the probe response frame to the STAs.

Figure 40:
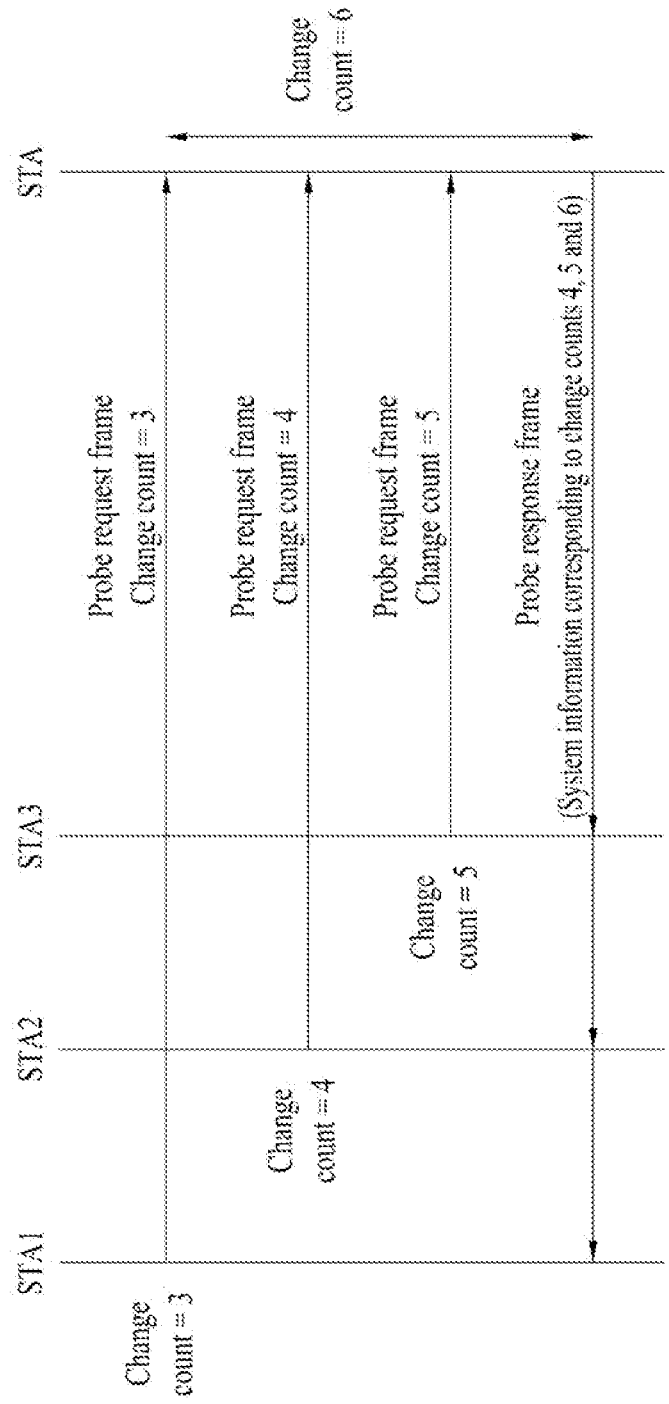
FIG. 40 illustrates an example of transmitting a probe response frame in a broadcast manner.

FIG. 40 illustrates an example of broadcasting a probe response frame. When the current configuration change count value of the AP is 6 whereas configuration change count values received from STA 1, STA 2 and STA 3 are respectively 3, 4 and 5, as in the example shown in FIG. 40, the AP can determine system information that needs to be updated by the STAs on the basis of the lowest configuration change count value. Since the configuration change count value received from STA 1 is the smallest in the example of FIG. 40, the AP can determine system information can configure a probe response frame including system information corresponding to configuration change counts 4, 5 and 6 on the basis of the configuration count value received from STA 1 and broadcast the probe response frame.

STAs 1, 2 and 3 can receive the broadcast probe response frame and update the system information.

Embodiment 5-6

In some aforementioned embodiments, the STA recognizes the current change sequence value (or configuration change count value) of the AP by receiving a short beacon from the AP. Alternatively, the change sequence value (or configuration change count value) of the AP may be transmitted to the STA through an FILS discovery frame.

The FILS discovery frame supports a quick AP (or network) for fast initial link setup and can be transmitted by an STA (i.e. AP) that transmits a beacon frame.

Embodiment 6

Even though the STA stores configuration change count information and system information on a preferred AP even after disassociation from the preferred AP, information (i.e. capability of the STA) on the STA and configuration change count information may be deleted from the AP if the AP is restarted due to reset or power outrage of the AP. However, the STA cannot correctly receive system information even if the STA compares configuration change count information since the STA cannot be aware of whether the preferred AP is restarted.

To solve this problem, when the restarted AP receives an FILS probe request frame from the preferred STA, the AP can include the duration to next full beacon field, information on the next TBTT or information for requesting a normal probe request frame, in an FILS probe response frame such that the STA can correctly receive the system information.

Figure 41:
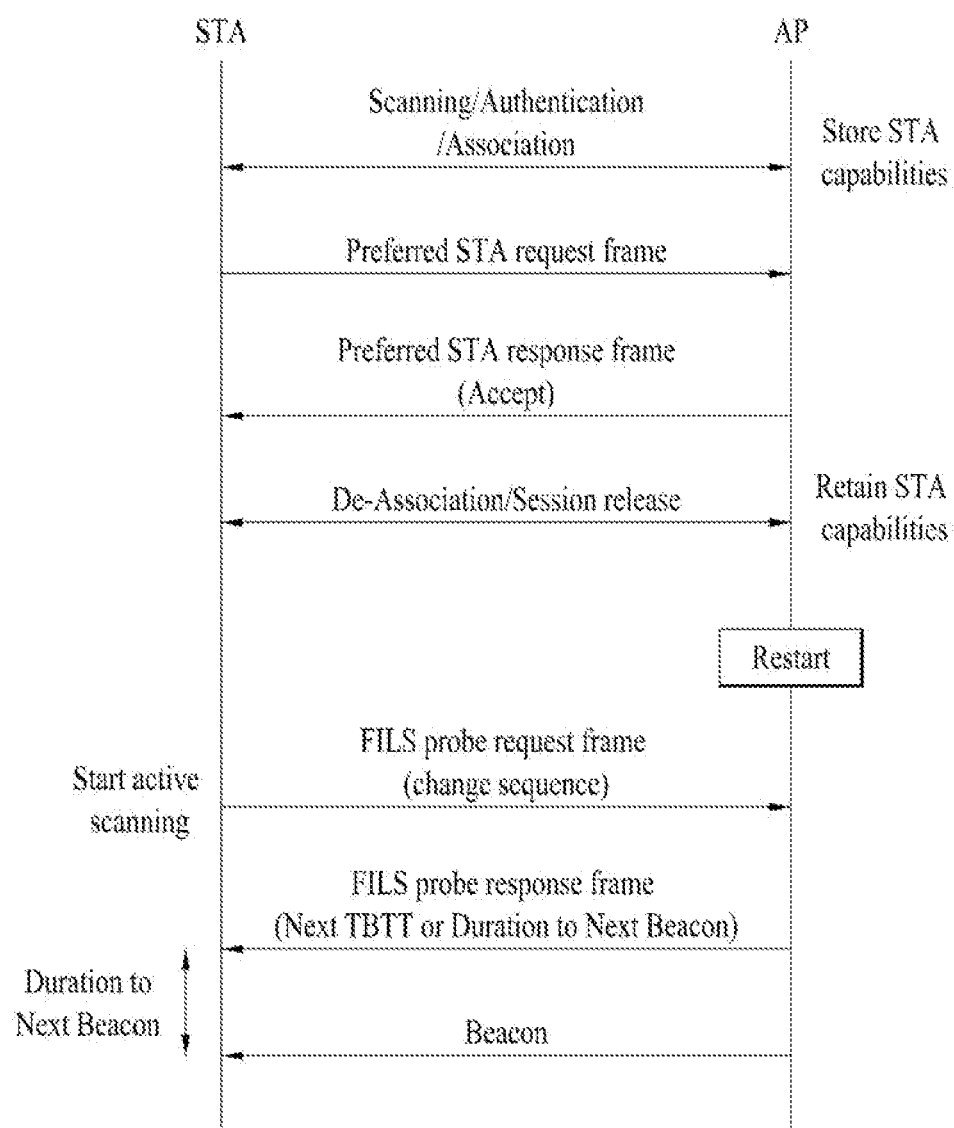
FIG. 41 is a diagram illustrating an example in which an FILS response frame includes a duration to next full beacon field or information on the next TBTT.

FIG. 41 illustrates an example in which an FILS response frame including the duration to next full beacon field or information on the next TBTT. Upon reception of an FILS probe request frame including change sequence information (or configuration change count information) from the preferred STA after restarted, the AP can transmit the FILS probe response frame including information on the next TBTT or the duration to next full beacon field to the STA.

The STA can receive a full beacon at a full beacon transmission time indicated by the FILS probe response frame and update system information.

Figure 42:
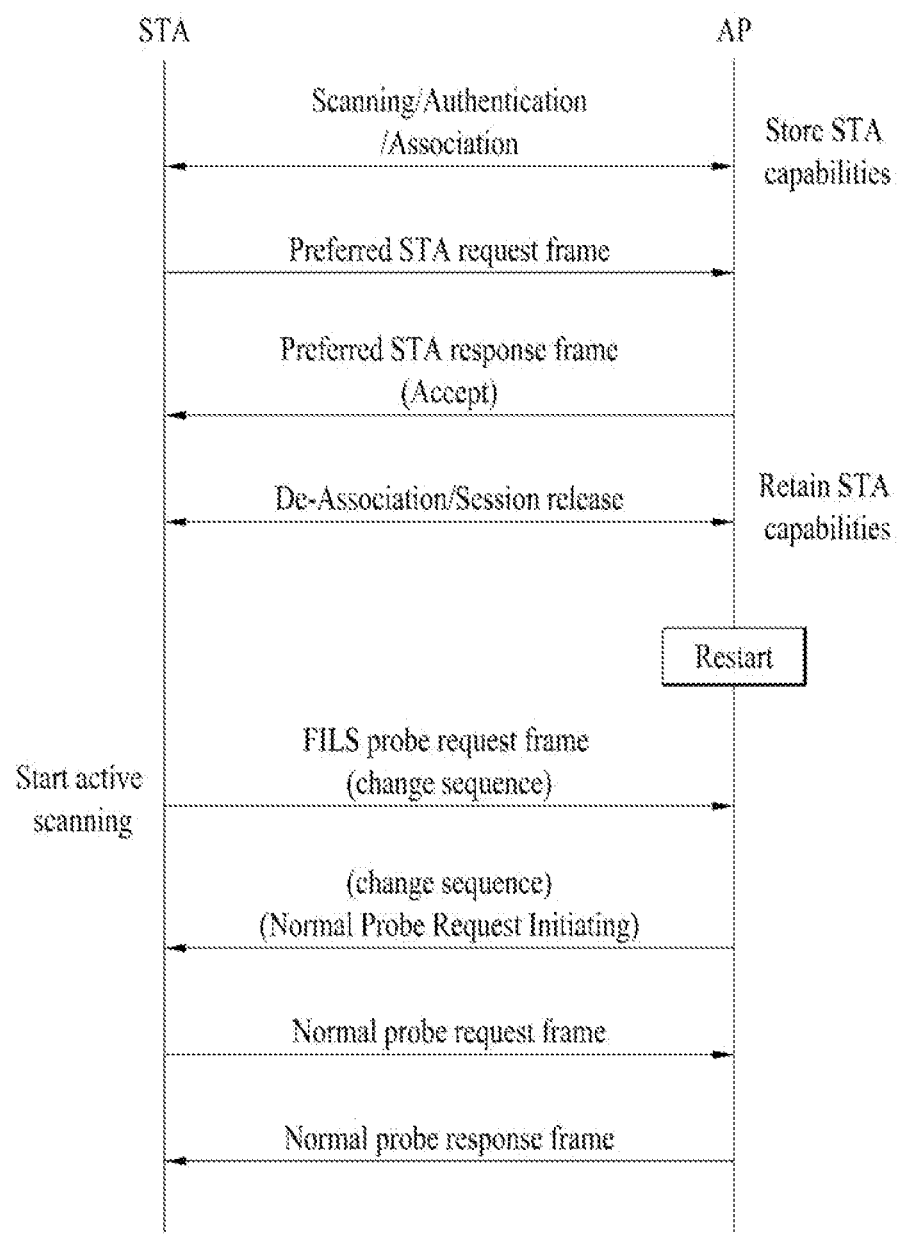
FIG. 42 is a diagram illustrating an example in which an FILS response frame includes information for requesting transmission of a normal probe request frame.

FIG. 42 illustrates an example in which an FILS response frame includes information for requesting transmission of a normal probe request frame. Upon reception of an FILS probe request frame including change sequence information (or configuration change count information) from the preferred STA after restart, the AP can transmit the FILS probe response frame including the information for requesting transmission of a normal probe request frame, as shown in FIG. 42. Upon reception of the FILS probe response frame, the STA can transmit the normal probe request frame, receive a normal probe response frame as a response to the normal probe request frame from the AP and update system information.

Which one of the information on the next TBTT (or duration to next full beacon field) and the information for requesting transmission of the normal probe request frame is included in the FILS response frame can be determined according to a duration to a transmission time of the next beacon (i.e. next TBTT). When the STA can immediately receive a full beacon since the next TBTT is short, the AP can include the information on the next TBTT (or duration to next full beacon field) in the FILS response frame. When the STA cannot receive a full beacon for a while since the next TBTT is long, the AP can include the information for requesting transmission of the normal probe request frame in the FILS response frame so as to support fast initial ink setup.

In the aforementioned system information update method according to the present invention, the above described various embodiments of the present invention may be independently applied or two or more thereof may be simultaneously applied.

Figure 43:
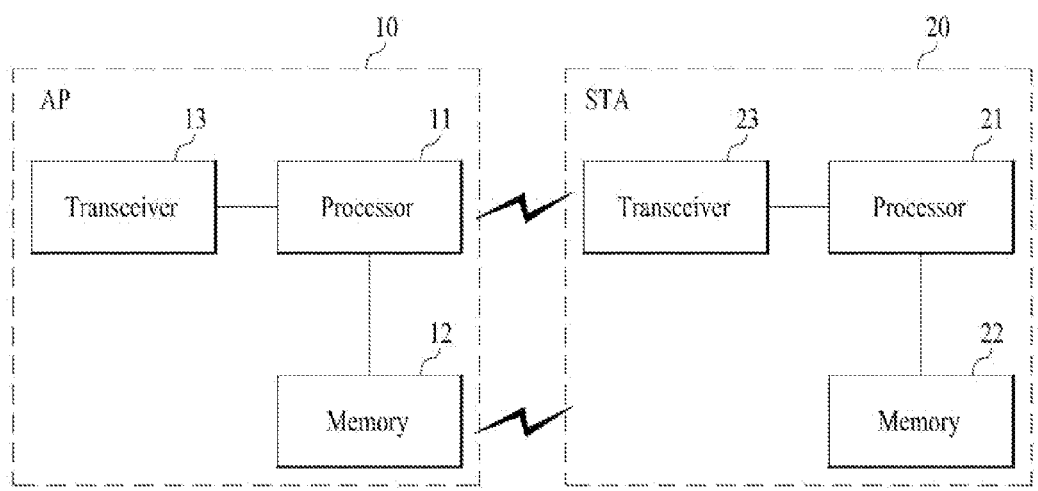
FIG. 43 is a block diagram illustrating a configuration of a radio apparatus according to an embodiment of the present invention.

FIG. 43 is a block diagram illustrating a configuration of a radio apparatus according to an embodiment of the present invention.

An AP 10 may include a processor 11, a memory 12 and a transceiver 13. An STA 20 may include a processor 21, a memory 22 and a transceiver 23. The transceivers 13 and 23 may transmit/receive radio signals and implement a physical layer according to IEEE 802, for example. The processors 11 and 21 may be connected to the transceivers 13 and 23 and implement the physical layer and/or a MAC layer according to IEEE 802. The processors 11 and 21 may be configured to perform operations according to the aforementioned various embodiments of the present invention. Further, modules that implement operations of the AP and STA according to the aforementioned various embodiments of the present invention may be stored in the memories 12 and 22 and executed by the processors 11 and 21. The memories 12 and 22 may be included in the processors 11 and 21 or provided to the outside of the processors 11 and 21 and connected to the processors 11 and 21 using a known means.

Detailed configurations of the aforementioned AP and STA may be implemented such that the above-described various embodiments of the present invention can be independently applied or two or more thereof can be simultaneously applied, and redundant description is omitted for clarity.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While various embodiments of the present invention have been described on the basis of IEEE 802/11, the embodiments can be equally applied to various mobile communication systems.

The invention claimed is:

1. A method for updating system information in a station (STA) of a wireless communication system, comprising:
transmitting, via the STA, a probe request frame, including a configuration change count field, to a preferred access point (AP); and
receiving, via the STA, a probe response frame from the preferred AP,
wherein if a value of the configuration change count field included in the probe request frame is different from a current count value of the preferred AP, the probe response frame includes one or more elements of system information needed to be updated to the STA,
wherein a count value of the preferred AP increases when a non-dynamic element of the system information is updated, and
wherein the count value of the preferred AP is associated with the value of the configuration change count field.

2. The method according to claim 1, wherein the count value of the preferred AP is not increased when a dynamic element of the system information is updated, and
the dynamic element of the system information includes at least one of a timestamp, basic service set (BSS), BSS load, beacon timing, time advertisement, BSS access category (AC), BSS AC access delay, BSS average access delay, BSS available admission capacity or TPC report element.

3. The method according to claim 1, wherein a length of the configuration change count field is defined as a 1-octet field and the value of the configuration change count field sets in a range of 0 to 255.

4. The method according to claim 1, wherein the probe response frame mandatorily comprises at least one of a timestamp field, a capability field or a beacon interval field.

5. The method according to claim 1, wherein the probe response frame is broadcasted when the preferred AP receives the probe request frame from a plurality of STAs.

6. The method according to claim 1, wherein the value of the configuration change count field corresponds to a past count value of the preferred AP which is obtained when the STA previously associated with the preferred AP.

7. The method according to claim 6, wherein if the preferred AP is restarted before receiving the probe request frame after previous disassociation with the STA, the probe response frame includes information indicating a next beacon reception time.

8. A method for providing system information updated in an access point (AP) of a wireless communication system, comprising:
receiving, via the AP, a probe request frame, including a configuration change count field; and
transmitting, via the AP, a probe response frame to a preferred STA,
wherein if a value of the configuration change count field included in the probe request frame is different from a current count value of the AP, the probe response frame includes one or more elements of system information needed to be updated to the preferred STA,
wherein a count value of the AP increases when a non-dynamic element of the system information is updated, and
wherein the count value of the AP is associated with the value of the configuration change count field.

9. The method according to claim 8, wherein the count value of the AP is not increased when a dynamic element of the system information is updated, and the dynamic elements of the system information includes at least one of a timestamp, basic service set (BSS), BSS load, beacon timing, time advertisement, BSS access category (AC), BSS AC access delay, BSS average access delay, BSS available admission capacity or TPC report element.

10. The method according to claim 8, wherein the probe response frame mandatorily comprises at least one of a timestamp field, a capability field or a beacon interval field.

11. A station (STA) configured to update system information in a wireless communication system, comprising:
a transceiver; and
a processor, wherein the processor is configured to control the transceiver to transmit a probe request frame, including a configuration change count field, to a preferred AP and to receive a probe response frame from the preferred AP, wherein if a value of the configuration change count field included in the probe request frame is different from a current count value of the preferred AP, the probe response frame includes one or more elements of system information needed to be updated to the STA, wherein a count value of the preferred AP increases when a non-dynamic element of the system information is updated, and wherein the count value of the preferred AP is associated with the value of the configuration change count field.

12. An access point (AP) configured to provide updated system information in a wireless communication system, comprising:

a transceiver; and a processor, wherein the processor is configured to control the transceiver to receive a probe request frame including a configuration change count field from a station (STA) and to transmit a probe response frame to the STA, wherein if a value of the configuration change count field included in the probe request frame is different from a current count value of the AP, the probe response frame includes one or more elements of system information needed to be updated to the STA, wherein a count value of the AP increases when a non-dynamic element of the system information is updated, and wherein the count value of the AP is associated with the value of the configuration change count field.

* * * * *